United States Patent
Kim et al.

(10) Patent No.: US 12,320,052 B2
(45) Date of Patent: Jun. 3, 2025

(54) CLOTHES TREATMENT APPARATUS AND METHOD OF CONTROLLING THE SAME

(71) Applicant: SAMSUNG ELECTRONICS CO., LTD., Suwon-si (KR)

(72) Inventors: Sungjong Kim, Suwon-si (KR); Hooijoong Kim, Suwon-si (KR); Junhyun Park, Suwon-si (KR); Moohyung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 17/953,922

(22) Filed: Sep. 27, 2022

(65) Prior Publication Data

US 2023/0193543 A1 Jun. 22, 2023

Related U.S. Application Data

(63) Continuation of application No. PCT/KR2022/013461, filed on Sep. 7, 2022.

(30) Foreign Application Priority Data

Dec. 16, 2021 (KR) .................... 10-2021-0180629

(51) Int. Cl.
*D06F 33/48* (2020.01)
*D06F 23/02* (2006.01)
(Continued)

(52) U.S. Cl.
CPC .............. *D06F 33/48* (2020.02); *D06F 23/02* (2013.01); *D06F 23/06* (2013.01); *D06F 34/05* (2020.02);
(Continued)

(58) Field of Classification Search
CPC .......... D06F 33/48; D06F 23/02; D06F 23/06; D06F 34/05; D06F 34/08; D06F 34/20;
(Continued)

(56) References Cited

U.S. PATENT DOCUMENTS 3,148,144 A * 9/1964 Cobb .................... D06F 37/36
74/572.4
3,219,773 A * 11/1965 Miller .................... D06F 33/48
210/144
(Continued)

FOREIGN PATENT DOCUMENTS

CN 210481800 U 5/2020
EP 3 875 661 A1 9/2021
(Continued)

OTHER PUBLICATIONS

JP2010051431 machine translation (Year: 2010).*
(Continued)

*Primary Examiner* — David J Bolduc
(74) *Attorney, Agent, or Firm* — STAAS & HALSEY LLP

(57) ABSTRACT

A clothes treatment apparatus for identifying a noise course in which abnormal noise occurs, the clothes treatment apparatus including: a frame forming a skeleton of a cabinet; a cover plate surrounding the frame to form an external appearance of the cabinet; a tub provided in the cabinet; a drum rotatably provided in the tub; a drum motor configured to rotate the drum; and a vibration sensor provided on the frame.

14 Claims, 21 Drawing Sheets

(51) Int. Cl.
| | |
|---|---|
| *D06F 23/06* | (2006.01) |
| *D06F 34/05* | (2020.01) |
| *D06F 34/08* | (2020.01) |
| *D06F 34/20* | (2020.01) |
| *D06F 34/32* | (2020.01) |
| *D06F 39/12* | (2006.01) |
| *D06F 58/04* | (2006.01) |
| *D06F 58/20* | (2006.01) |
| *D06F 58/50* | (2020.01) |
| *G01M 99/00* | (2011.01) |
| *D06F 103/26* | (2020.01) |
| *D06F 105/48* | (2020.01) |
| *D06F 105/58* | (2020.01) |

(52) U.S. Cl.
CPC .............. *D06F 34/08* (2020.02); *D06F 34/20* (2020.02); *D06F 34/32* (2020.02); *D06F 39/12* (2013.01); *D06F 58/04* (2013.01); *D06F 58/20* (2013.01); *D06F 58/50* (2020.02); *G01M 99/005* (2013.01); *D06F 2103/26* (2020.02); *D06F 2105/48* (2020.02); *D06F 2105/58* (2020.02)

(58) Field of Classification Search
CPC .......... D06F 34/32; D06F 39/12; D06F 58/04; D06F 58/20; D06F 58/50; D06F 2103/26; D06F 2105/48; D06F 2105/58; D06F 33/76; D06F 34/34; D06F 37/10; D06F 37/20; D06F 2105/00; D06F 34/16; D06F 37/28; D06F 39/14; D06F 37/206; G01M 99/005; G01M 7/00
See application file for complete search history.

(56) References Cited

U.S. PATENT DOCUMENTS

| | | | | |
|---|---|---|---|---|
| 3,268,791 A | * | 8/1966 | Burns | H02P 25/10 68/23.1 |
| 3,283,547 A | * | 11/1966 | Severance | D06F 33/48 68/12.02 |
| 3,446,043 A | * | 5/1969 | Severance | D06F 33/48 68/23.2 |
| 4,893,484 A | * | 1/1990 | Takahashi | D06F 34/10 68/12.01 |
| 5,080,204 A | * | 1/1992 | Bauer | F16F 7/09 68/23.1 |
| 5,280,660 A | * | 1/1994 | Pellerin | D06F 33/48 8/158 |
| 6,865,947 B2 | | 3/2005 | Baek | |
| 10,280,547 B2 | * | 5/2019 | Davis | D06F 33/48 |
| 11,149,372 B2 | | 10/2021 | Shinohara et al. | |
| 2004/0148973 A1 | * | 8/2004 | No | D06F 34/16 68/12.02 |
| 2004/0154351 A1 | * | 8/2004 | Kim | D06F 34/16 68/23.1 |
| 2005/0188473 A1 | * | 9/2005 | Son | D06F 33/40 68/23.1 |
| 2007/0039106 A1 | | 2/2007 | Stansel et al. | |
| 2007/0039359 A1 | * | 2/2007 | Lee | G01H 9/00 68/23.1 |
| 2012/0005840 A1 | * | 1/2012 | Jang | D06L 1/20 68/12.04 |
| 2012/0089258 A1 | * | 4/2012 | Wong | D06F 37/225 312/228 |
| 2013/0125595 A1 | * | 5/2013 | Seo | D06F 34/18 177/1 |
| 2014/0042946 A1 | * | 2/2014 | Rhodes | D06F 33/48 318/467 |
| 2014/0083142 A1 | * | 3/2014 | Chung | D06F 33/48 700/280 |
| 2015/0128658 A1 | * | 5/2015 | Jang | D06F 37/304 318/400.11 |
| 2017/0054394 A1 | * | 2/2017 | Jung | H02P 27/06 |
| 2018/0291548 A1 | * | 10/2018 | Cho | D06F 33/00 |
| 2018/0355545 A1 | * | 12/2018 | Jung | D06F 39/087 |
| 2019/0264367 A1 | * | 8/2019 | Kim | D06F 33/40 |
| 2019/0390389 A1 | | 12/2019 | Lee et al. | |
| 2019/0390390 A1 | * | 12/2019 | Jeong | D06F 33/48 |
| 2020/0181826 A1 | * | 6/2020 | Kim | D06F 33/48 |
| 2020/0308749 A1 | * | 10/2020 | Ohyagi | D06F 39/08 |
| 2021/0017686 A1 | | 1/2021 | Chang et al. | |
| 2022/0098779 A1 | * | 3/2022 | Coney | D06F 34/14 |
| 2022/0145508 A1 | * | 5/2022 | Masters, Jr. | D06F 39/12 |
| 2022/0372687 A1 | * | 11/2022 | Park | D06F 33/32 |

FOREIGN PATENT DOCUMENTS

| | | |
|---|---|---|
| JP | 10-26580 | 1/1998 |
| JP | 2010-51431 | 3/2010 |
| JP | 2021-186556 | 12/2021 |
| JP | 7245725 | 3/2023 |
| KR | 1999-0035619 | 5/1999 |
| KR | 2000-0056493 | 9/2000 |
| KR | 10-2005-0050479 | 5/2005 |
| KR | 10-2005-0111661 | 11/2005 |
| KR | 10-0667274 | 1/2007 |
| KR | 10-2008-0042603 | 5/2008 |
| KR | 10-2010-0082448 | 7/2010 |
| KR | 10-1054431 | 8/2011 |
| KR | 10-2011-0122483 | 11/2011 |
| KR | 10-1138664 | 4/2012 |
| KR | 10-1138888 | 5/2012 |
| KR | 10-2019-0094012 | 8/2019 |
| KR | 10-2021-0009963 | 1/2021 |
| KR | 10-2405804 | 6/2022 |

OTHER PUBLICATIONS

International Search Report dated Jan. 4, 2023 in International Patent Application No. PCT/KR2022/013461 (3 pages; 3 pages translation).
PCT/ISA/237 dated Jan. 4, 2023 in International Patent Application No. PCT/KR2022/013461 (4 pages).
Supplementary European Search Report dated Nov. 5, 2024 issued in European Application No. EP 22 90 7624.

* cited by examiner

FIG. 10

| MAIN NOISE SOURCE | | LAUNDRY ROTATING BODY (DRUM) | SHAFT Unbalanace | ROTATION FREQUENCY(HZ) | | MOTOR BASIC (1X) | MOTOR HARMONICS (2X) | DRAIN PUMP | |
|---|---|---|---|---|---|---|---|---|---|
| | | | | | ROTATING BODY (BEARING) | | | AC | DC |
| | Order | 1st | 2nd | ... | 9th | 36th | 72nd | | |
| ROTATION SPEED (RPM) | 120 | 2 | 4 | | 18 | 72 | 144 | 50/60 | |
| | 240 | 4 | 8 | | 36 | 144 | 288 | | |
| | 360 | 6 | 12 | | 54 | 216 | 432 | | |
| | ... | | | | | | | | |
| | 900 | 15 | 30 | | 135 | 540 | 1080 | | |
| | 1200 | 20 | 40 | | 180 | 720 | 1440 | | |

CLOTHES TREATMENT APPARATUS AND METHOD OF CONTROLLING THE SAME

CROSS-REFERENCE TO RELATED APPLICATION

This application is a continuation application, under 35 USC § 111(a), of International Application No. PCT/KR2022/013461, filed on Sep. 7, 2022, which claims priority to Korean Patent Application No. 10-2021-0180629, filed on Dec. 16, 2021, in the Korean Intellectual Property Office, the disclosure of which is incorporated by reference herein in its entirety.

BACKGROUND

1. Field

The disclosed relates to a clothes treatment apparatus and a method of controlling the same, and more specifically, to a clothes treatment apparatus capable of identifying a noise source and reducing noise and a method of controlling the same.

2. Description of Related Art

In general, a clothes treatment apparatus may refer to a washing machine that washes a washing object by rotating a drum in which the washing object and wash water are contained, or a drying machine that dries a drying object by rotating a drum in which the drying object is contained and supplying hot air.

In the case of the clothes treatment apparatus, various types of noise may occur due to vibration generated as the drum rotates at a high speed during an operation cycle.

For example, when a washing object or a drying object is unevenly disposed inside the drum (occurrence of unbalance), eccentricity may occur in the rotating drum, increasing vibration of a tub, causing abnormal noise.

As another example, according to the installation environment of the clothes treatment apparatus, vibration of the tub may increase, causing abnormal noise.

As such, noise occurring during the operation cycle of the clothes treatment apparatus may cause inconvenience to the user.

SUMMARY

According to an aspect of the disclosure, there is provided a clothes treatment apparatus including: a frame to from a skeleton of a cabinet; a cover plate surrounding the frame and forming an external surface of the cabinet; a tub to be positioned in the cabinet; a drum to be positioned in the tub and configured to be rotatable; a motor configured to rotate the drum; and a vibration sensor which is positioned on the frame to sense a vibration of the frame and output a vibration signal related to the vibration of the frame.

The clothes treatment apparatus may further include a processor configured to convert the vibration signal in a time domain into a vibration signal in a frequency domain, classify the vibration signal in the frequency domain into a plurality of orders based on a rotation speed of the motor, and determine a noise source of the clothes treatment apparatus based on amplitudes of the plurality of orders.

The processor may be configured to: compare the amplitude of each of the plurality of orders with a reference amplitude corresponding to a respective one of the plurality of orders; determine a defect order having an amplitude exceeding the reference amplitude from among the plurality of orders; and determine an object corresponding to the defect order as the noise source.

The clothes treatment apparatus may further include a communicator configured to communicate with an external device, wherein the processor may be configured to control the communicator to transmit information about the noise source of the clothes treatment apparatus to the external device.

The clothes treatment apparatus may further include a display, wherein the processor may be configured to control the display to display information about the noise source of the clothes treatment apparatus.

The processor may be configured to determine an installation environment of the clothes treatment apparatus based on the vibration signal in the time domain.

The processor may be configured to adjust the rotation speed of the drum motor based on the vibration signal in the time domain.

The cabinet further comprising a door at a front of the cabinet, the frame may include a plurality of post frames corresponding to edges along a longitudinal direction of the cabinet, and the vibration sensor may be attachable to a post frame on a front side of the cabinet among the plurality of post frames.

The post frame on the front side of the cabinet may include: a left side post frame including a first panel formed to extend rightward with respect to a left side longitudinal edge of the cabinet and a second panel formed to extend rearward with respect to the left side longitudinal edge of the cabinet, and a right side post frame including a third panel formed to extend leftward with respect to a right side longitudinal edge of the cabinet and a fourth panel formed to extend rearward with respect to the right side longitudinal edge of the cabinet, wherein the vibration sensor may be attachable to one of a rear surface of the first panel, a right surface of the second panel, a rear surface of the third panel, and a left surface of the fourth panel.

The vibration sensor may be attachable to an upper side of the post frame.

The frame may include a plurality of horizontal frames corresponding to edges in a traverse direction of the cabinet, and the vibration sensor may be attachable to an upper horizontal frame on a front side of the cabinet among the plurality of horizontal post frames.

The cover plate may include a front plate corresponding to the front of the cabinet, and the vibration sensor may be attachable to the upper horizontal frame without being in contact with the front plate.

According to another aspect of the disclosure, there is provided a method of controlling a clothes treatment apparatus, the method including: receiving a vibration signal in a time domain output from the vibration sensor attached to a frame forming a cabinet of the clothes treatment apparatus; converting the vibration signal in the time domain into a vibration signal in a frequency domain; classifying the vibration signal in the frequency domain into a plurality of orders based on a rotation speed of a drum motor; and determining a noise source of the clothes treatment apparatus based on amplitudes of the plurality of orders.

The determining of the noise source may include: comparing the amplitude of each of the plurality of orders with a reference amplitude corresponding to a respective one of the plurality of orders; determining a defect order having an amplitude exceeding the reference amplitude from among the plurality of orders; and determining an object corresponding to the defect order as the noise source.

The method may further include transmitting information about the noise source of the clothes treatment apparatus to an external device.

The method may further include displaying information about a noise source of the clothes treatment apparatus on a display.

The method may further include determining an installation environment of the clothes treatment apparatus based on a vibration signal in the time domain.

The method may further include adjusting a rotation speed of the drum motor based on the vibration signal in the time domain.

The adjusting of the rotation speed of the drum motor may include decelerating the rotation speed of the drum motor based on an amplitude of the vibration signal in the time domain being greater than or equal to a preset value.

The frame may include a plurality of post frames corresponding to longitudinal edges of the cabinet and a plurality of horizontal frames corresponding to traverse edges of the cabinet, and the vibration sensor may be attached to a post frame on a front side of the cabinet among the plurality of post frames or may be attached to an upper horizontal frame on a front side of the cabinet among the plurality of horizontal frames.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a view illustrating a plurality of orders corresponding to a plurality of noise sources of the clothes treatment apparatus according to an embodiment.

DETAILED DESCRIPTION

Figure 1:
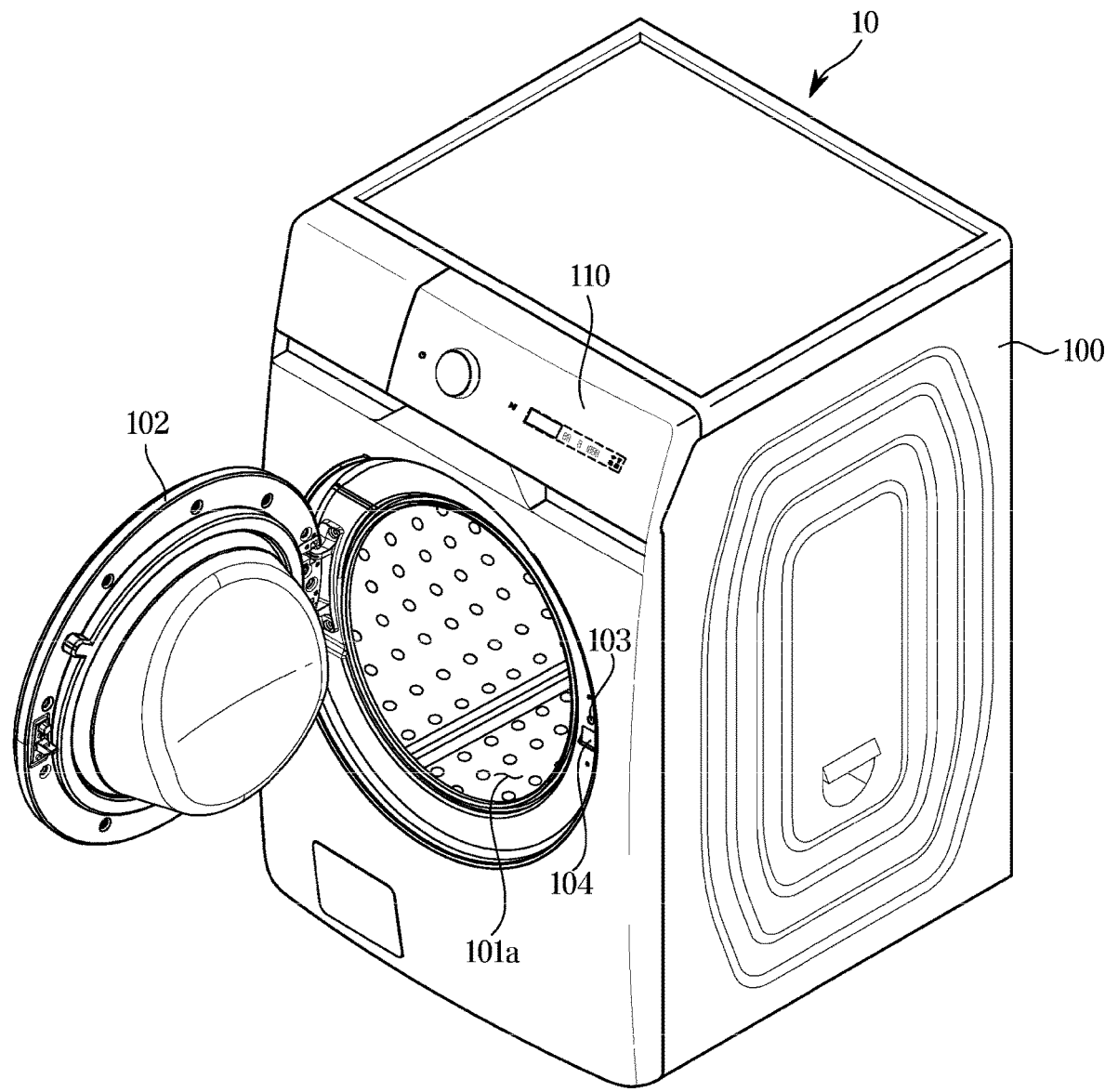
FIG. 1 is a view illustrating an external appearance of a clothes treatment apparatus according to an embodiment.
Figure 1:
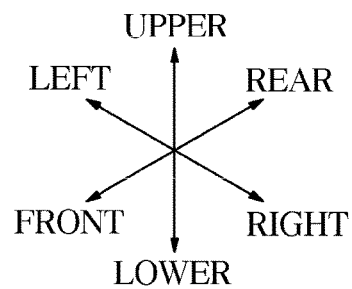

The embodiments described in the present specification and the configurations shown in the drawings are only examples of preferred embodiments of the disclosure, and various modifications may be made at the time of filing of the disclosure to replace the embodiments and drawings of the present specification.

The terms used herein are for the purpose of describing the embodiments and are not intended to restrict and/or to limit the disclosure.

For example, the singular expressions herein may include plural expressions, unless the context clearly dictates otherwise.

In addition, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another.

The terms, such as "— part", "—device", "—block", "—member", "— module", and the like may refer to a unit for processing at least one function or act. For example, the terms may refer to at least process processed by at least one hardware, such as field-programmable gate array (FPGA)/application specific integrated circuit (ASIC), software stored in memories, or processors.

Hereinafter, an embodiment of the disclosure will be described in detail with reference to the accompanying drawings. Throughout the drawings, like reference numbers or signs represent parts or components that perform substantially the same functions.

Hereinafter, the principles and embodiments of the disclosure will be described with reference to the accompanying drawings.

According to one aspect of the disclosure, a noise source of abnormal noise can be accurately identified by installing a vibration sensor at an optimal position.

According to one aspect of the disclosure, user's complaints about abnormal noise can be reduced by identifying a noise source of abnormal noise occurring in the clothes processing apparatus and providing a user with information about the noise source.

According to an aspect of the disclosure, vibration and noise generated during the operation cycle of the clothes treatment apparatus can be reduced.

Figure 2:
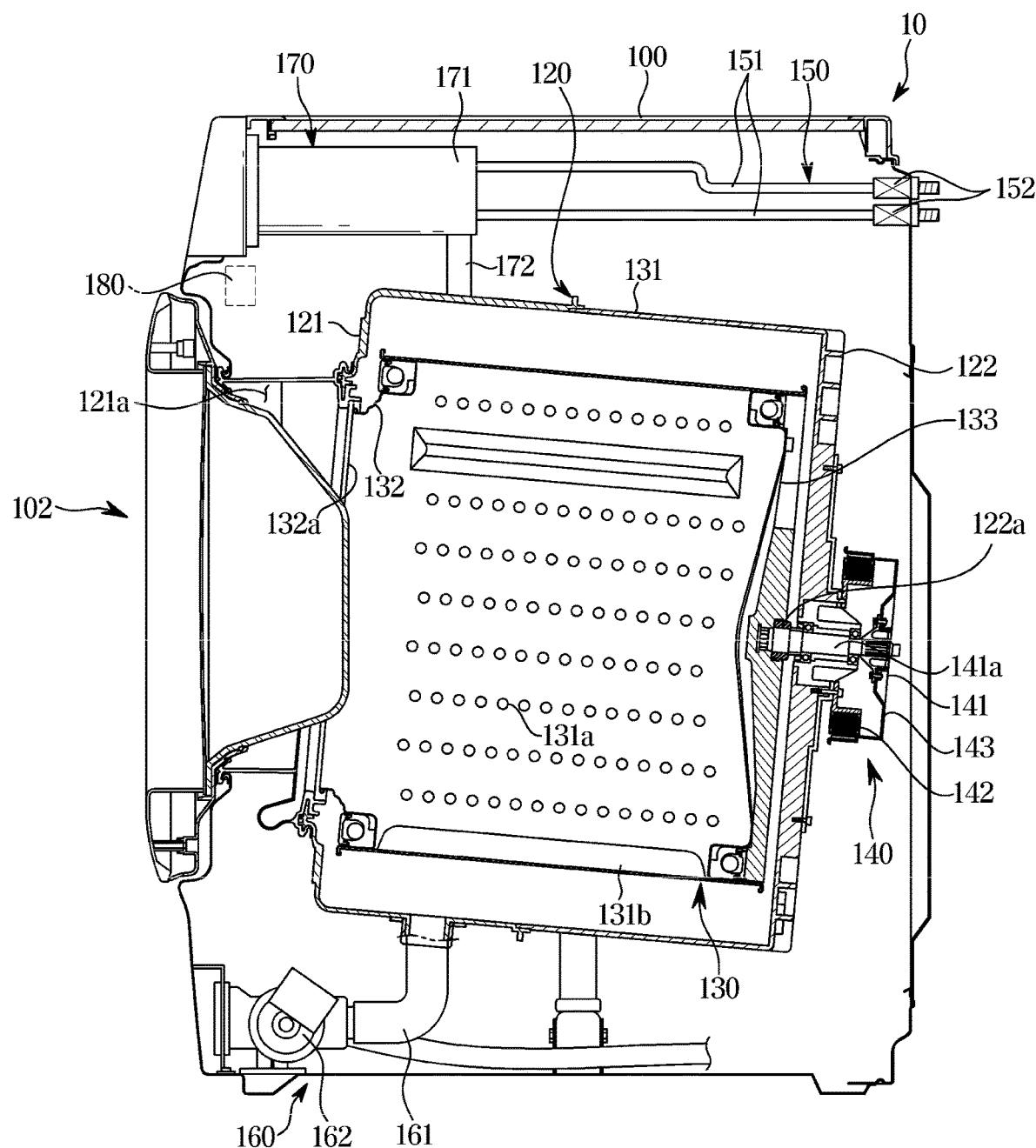
FIG. 2 is a side cross-sectional view illustrating a clothes treatment apparatus according to an embodiment.

FIG. 1 is a view illustrating an external appearance of a clothes treatment apparatus according to an embodiment, and FIG. 2 is a side cross-sectional view illustrating a clothes treatment apparatus according to an embodiment.

In the disclosure, a clothes treatment apparatus 10 may refer to a washing machine for washing clothes or a drying machine for drying clothes. Hereinafter, for the sake of convenience of description, it is assumed that the clothes treatment apparatus 10 is a washing machine.

However, the clothes treatment apparatus 10 may also refer to a drying machine, and the drying machine may include components (e.g., a cabinet 100, a tub 120, a drum 130, a control panel 110, and a vibration sensor 180) that are common to a washing machine to be described below, and may further include additional components (e.g., a heat pump device, a hot air supply passage), and the like.

Referring to FIGS. 1 and 2, the clothes treatment apparatus 10 may include a cabinet 100 and a door 102 provided on a front side of the cabinet 100. The cabinet 100 may be provided at the center of the front with an inlet 101a for inputting or withdrawing laundry. The door 102 may be provided to open or close the inlet 101a. The door 102 may have one side rotatably mounted by a hinge. The closing of the inlet 101a by the door 102 may be detected by a door switch 103. When the inlet 101a is closed and the clothes treatment apparatus 10 operates, the door 102 may be locked by a door lock 104.

In addition, the clothes treatment apparatus 10 may include a control panel 110, a tub 120, a drum 130, a driver 140, a water supply 150, a drainer 160, a detergent supply 170, and a vibration sensor 180.

The cabinet 100 may be provided at a front upper side with the control panel 110 including an inputter 112 for obtaining a user input and a display for displaying operation information of the clothes treatment apparatus 10. The control panel 110 may provide a user interface for interaction between a user and the clothes treatment apparatus 10.

The tub 120 may be provided inside the cabinet 100 and accommodate water for washing and/or rinsing. The tub 120 may include a tub front part 121 having a front side with an opening 121a and a tub rear part 122 formed in a cylindrical shape and having a rear side closed. The tub front part 121 may be provided with the opening 121a for inputting or withdrawing laundry into or from the drum 130. The tub rear part 122 may be provided at a rear wall thereof with a bearing 122a for rotatably fixing a drum motor 141.

The drum 130 may be rotatably provided inside the tub 120 and accommodate laundry. The drum 130 may include a drum body 131 having a cylindrical shape, a drum front part 132 provided on the front side of the drum body 131, and a drum rear part 133 provided on the rear side of the drum body 131. The tub 120 and the drum 130 may be disposed to be inclined with respect to the ground. However, the tub 120 and the drum 130 may be arranged horizontally with the ground.

The drum body 131 may be provided on an inner surface thereof with a through hole 131a connecting the inside of the drum 130 and the inside of the tub 120 to each other and a lifter 131b for lifting laundry to the upper side of the drum 130 during rotation of the drum 130. The drum front part 132 may be provided with an opening 132a for inputting or withdrawing laundry into or from the drum 130. The drum rear part 133 may be connected to a shaft 141a of the drum motor 141 that rotates the drum 130.

The drum motor 141 may rotate the drum 130. The drum motor 141 may be included in the driver 140. The drum motor 141 may be provided outside the tub rear part 122 and connected to the drum rear part 133 through the shaft 141a. The shaft 141a may pass through the tub rear part 122 and may be rotatably supported by the bearing 122a provided on the tub rear part 122.

The drum motor 141 may include a stator 142 fixed to the outside of the tub rear part 122 and a rotor 143 rotatably provided and connected to the shaft 141a. The rotor 143 may rotate by magnetic interaction with the stator 142, and the rotation of the rotor 143 may be transmitted to the drum 130 through the shaft 141a. Examples of the drum motor 141 may include a brushless direct current (BLDC) motor or a permanent magnet synchronous motor (PMSM) that facilitates control of the rotation speed.

According to various embodiments, the clothes treatment apparatus 10 may further include a pulsator (not shown) that rotates independently of the drum 130.

The pulsator may rotate independently of the drum 130 to form a water flow inside the drum 130.

In one embodiment, the pulsator may receive power from the drum motor 141, or may receive power by a pulsator motor provided separately from the drum motor 141.

When the pulsator receives power from the drum motor 141, the drum motor 141 may be implemented as a dual rotor motor having one stator and two rotors (e.g., an inner rotor and an outer rotor), and one of the two rotors may be connected to the drum 130, and the other may be connected to the pulsator.

The water supply 150 may supply water to the tub 120 and the drum 130. The water supply 150 may include a water supply pipe 151 connected to an external water supply source to supply water to the tub 120, and a water supply valve 152 provided in the water supply pipe 151. The water supply pipe 151 may be provided on the upper side of the tub 120, and may extend from the external water supply source to a detergent container 171.

Water may flow into the tub 120 through the detergent container 171.

The water supply valve 152 may open or close the water supply pipe 151 in response to an electrical signal from a controller 190. That is, the water supply valve 152 may allow or block the supply of water to the tub 120 from the external water supply source. The water supply valve 152 may include, for example, a solenoid valve that opens and closes in response to an electrical signal.

The drainer 160 may discharge the water contained in the tub 120 and/or the drum 130 to the outside. The drainer 160 may include a drain pipe 161 extending from a lower side of the tub 120 to the outside of the cabinet 100 and a drain pump 162 provided on the drain pipe 161. The drain pump 162 may pump water of the drain pipe 161 to the outside of the cabinet 100.

The detergent supply 170 may supply detergent to the tub 120 and/or the drum 130. The detergent supply 170 may include a detergent container 171 provided on the upper side of the tub 120 to store detergent, and a mixing pipe 172 connecting the detergent container 171 to the tub 120. The detergent container 171 may be connected to the water supply pipe 151, and water supplied through the water supply pipe 151 may be mixed with the detergent of the detergent container 171. A mixture of detergent and water may be supplied to the tub 120 through the mixing pipe 172.

Figure 3A:
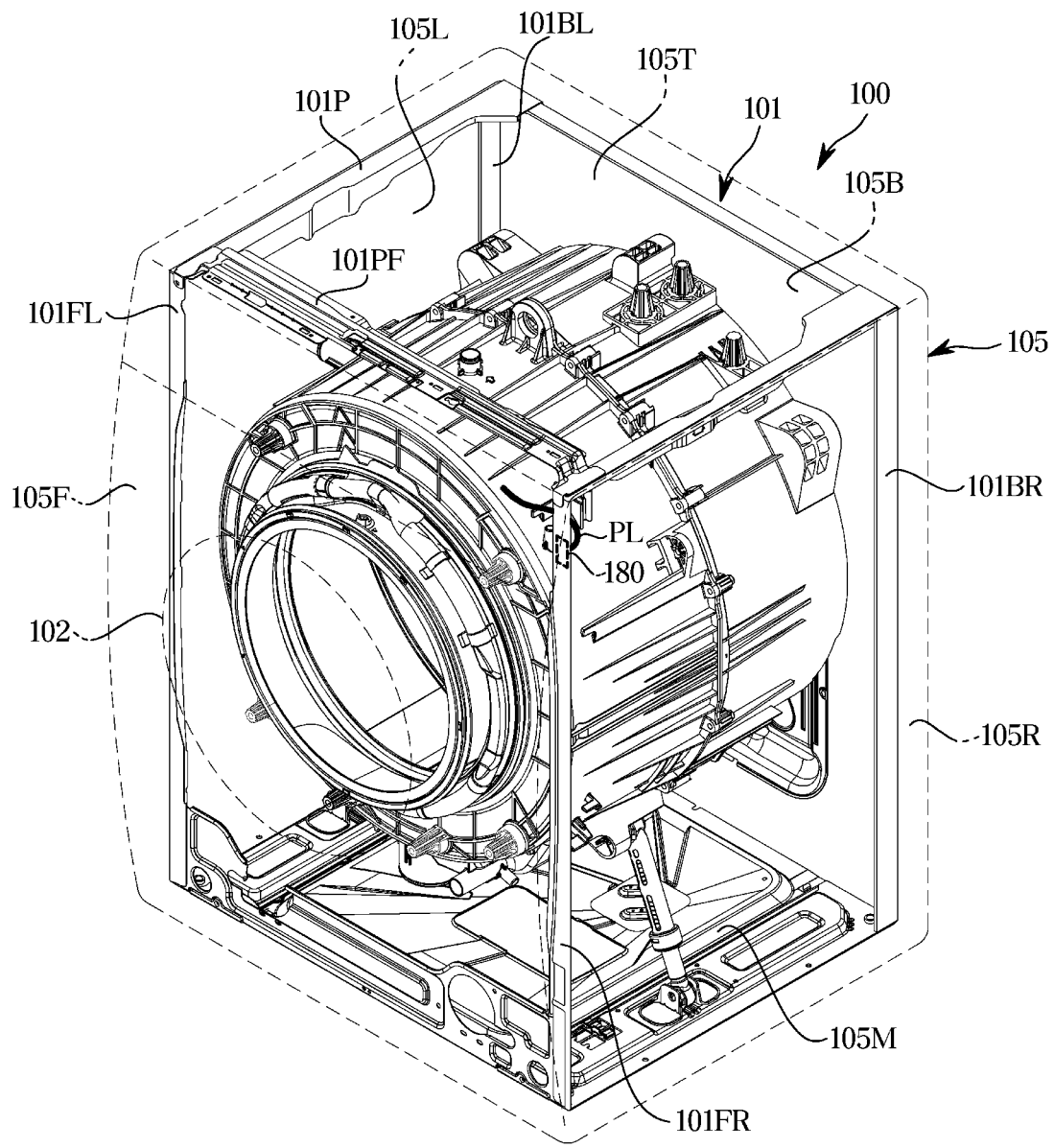
FIG. 3A is a view for describing an installation position of a vibration sensor according to an embodiment.
Figure 3A:
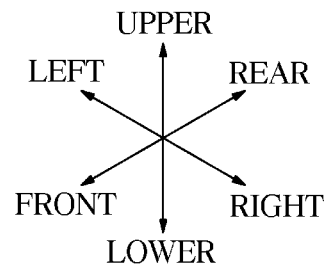
Figure 3B:
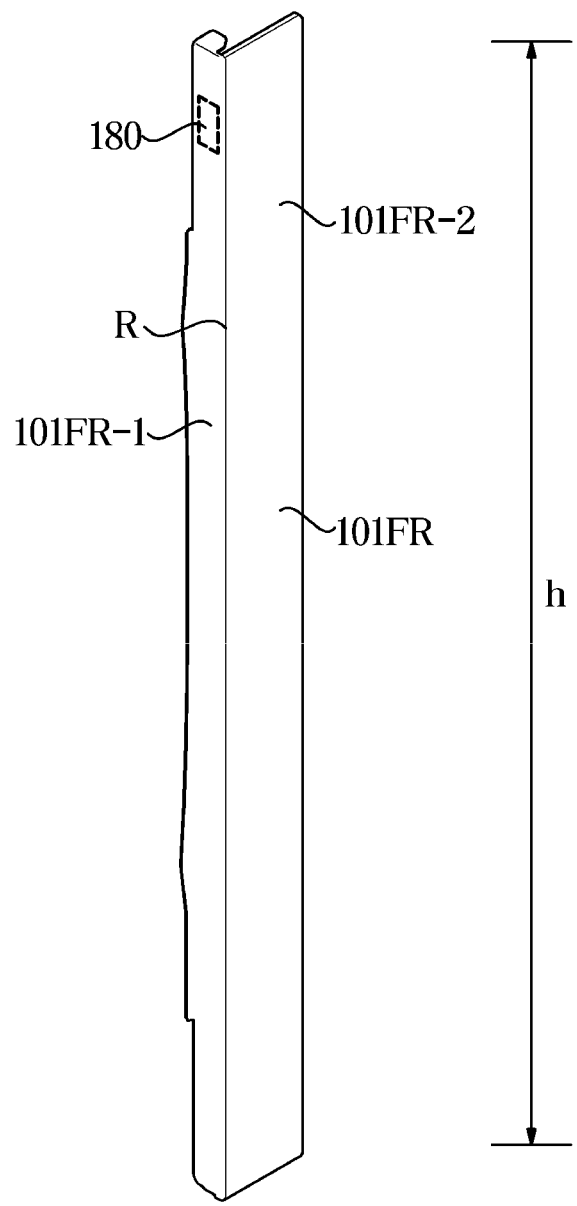
FIG. 3B is a view for describing an installation position of a vibration sensor according to an embodiment.
Figure 3B:
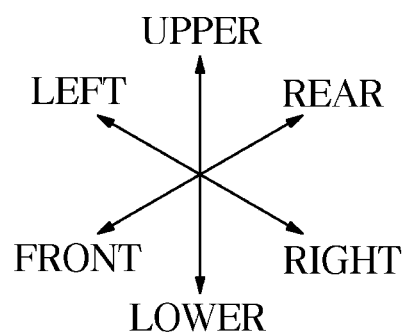
Figure 3C:
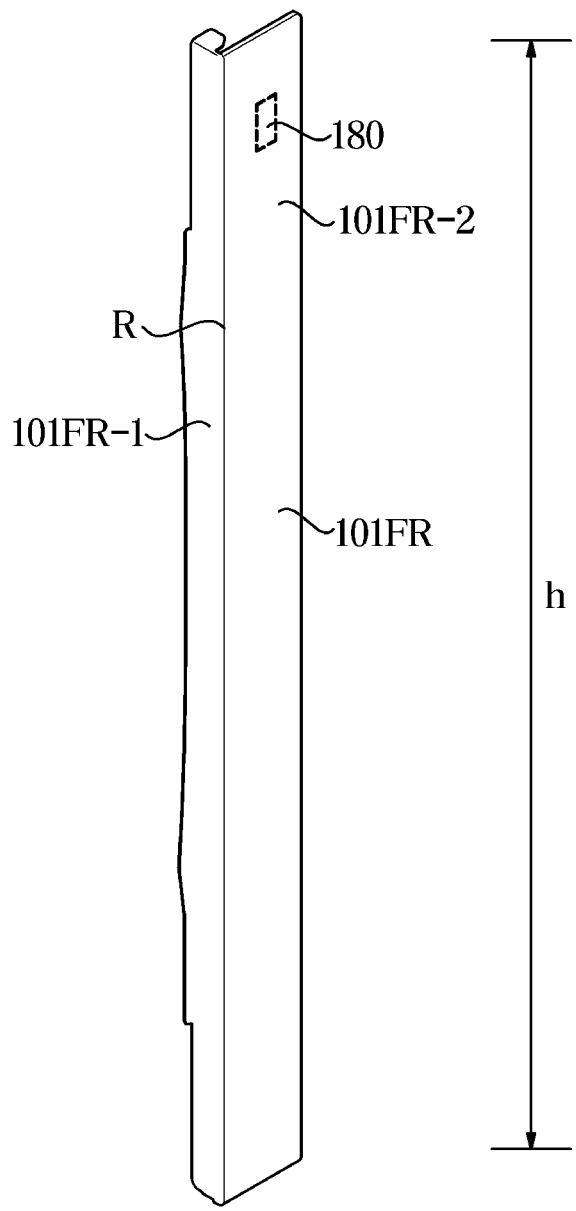
FIG. 3C is a view for describing an installation position of a vibration sensor according to an embodiment.
Figure 3C:
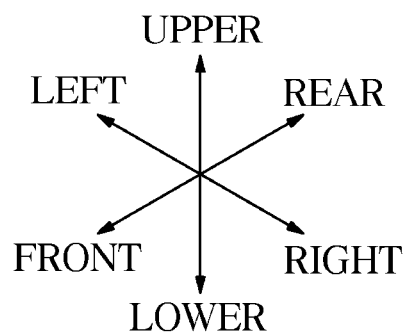
Figure 4A:
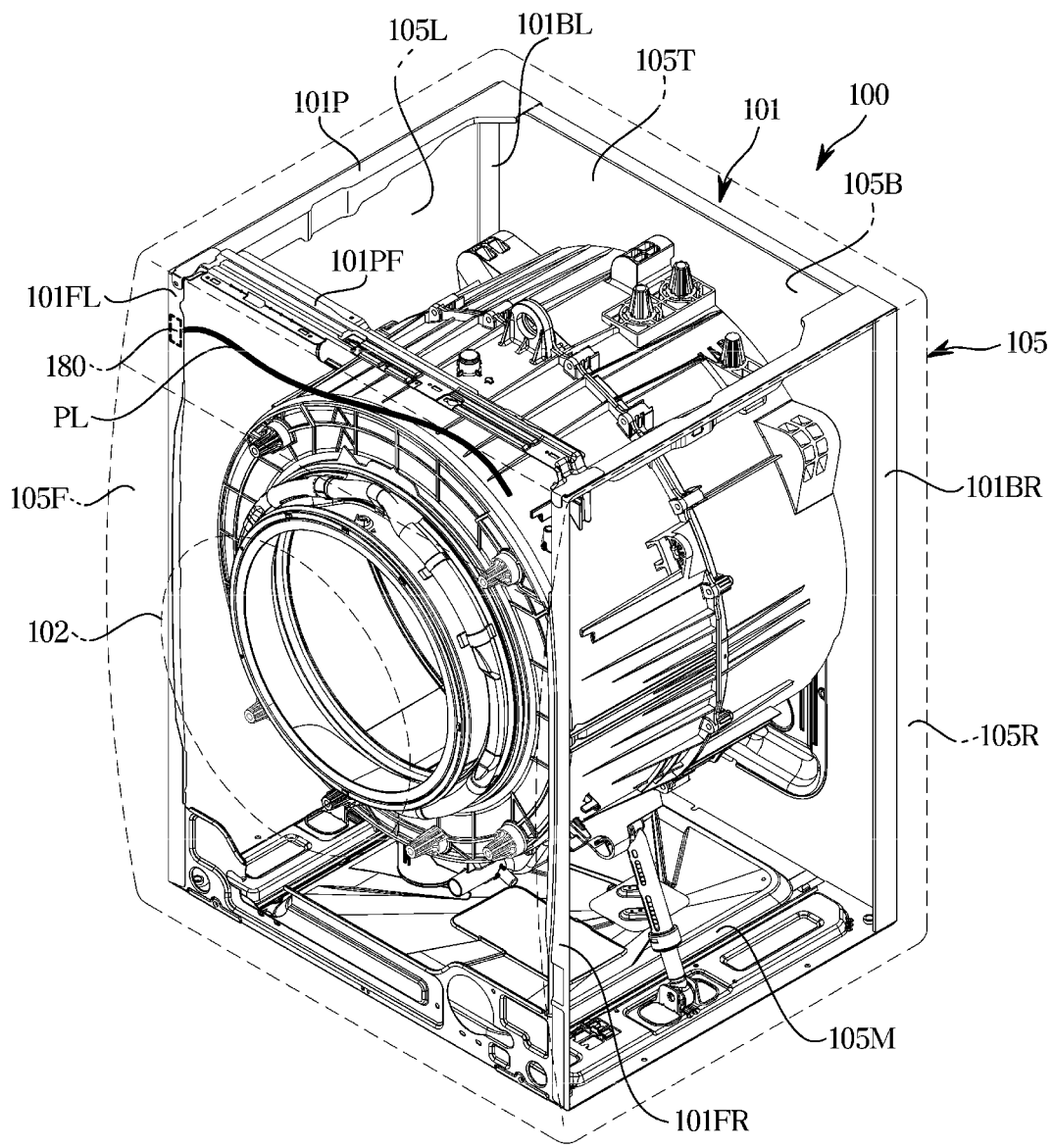
FIG. 4A is a view for describing an installation position of a vibration sensor according to another embodiment.
Figure 4A:
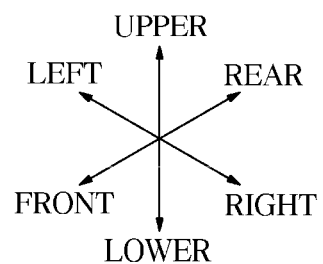
Figure 4B:
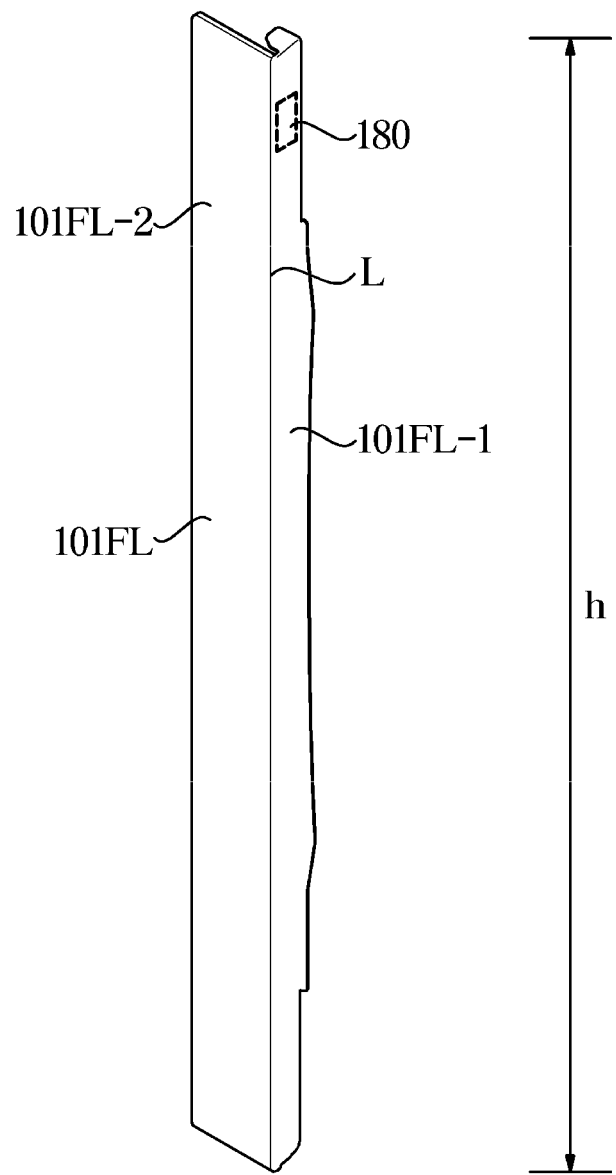
FIG. 4B is a view for describing an installation position of a vibration sensor according to another embodiment.
Figure 4B:
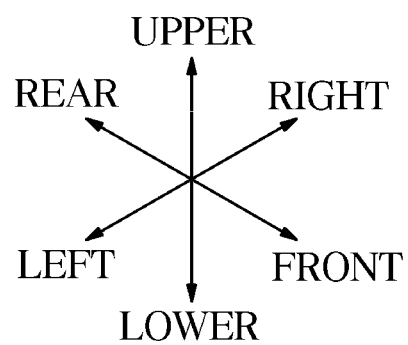
Figure 4C:
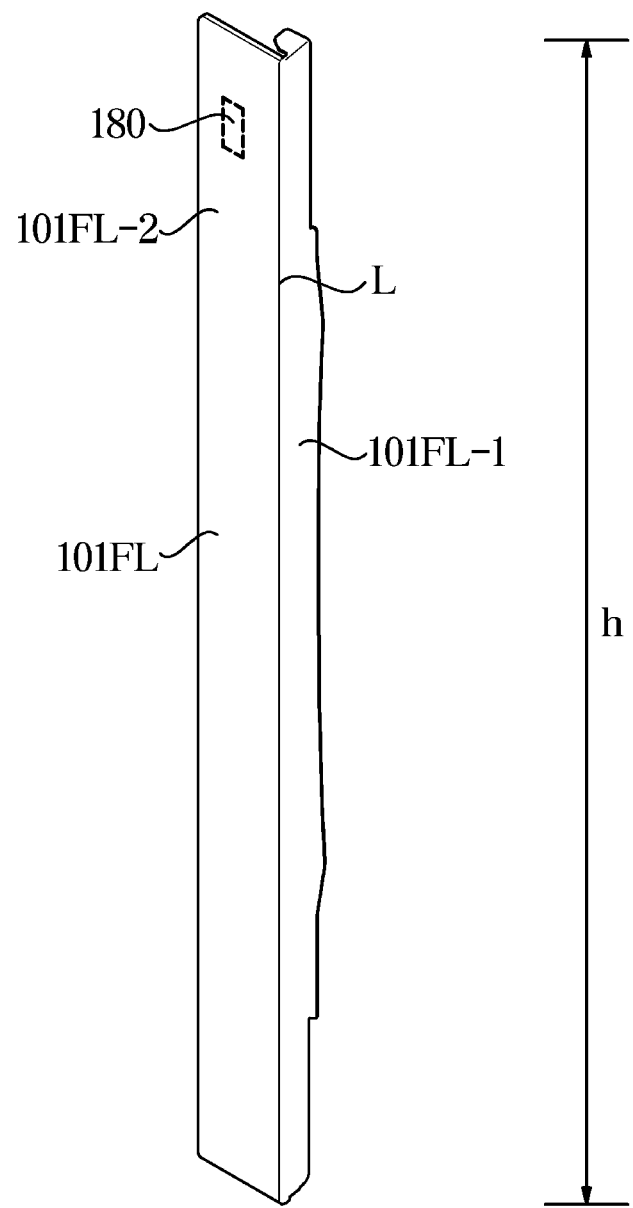
FIG. 4C is a view for describing an installation position of a vibration sensor according to another embodiment.
Figure 4C:
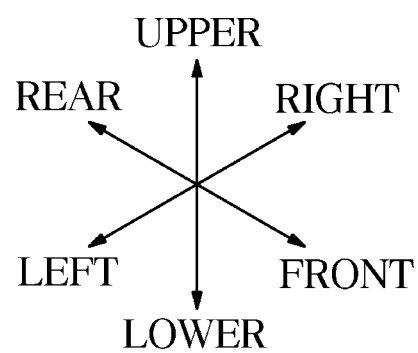
Figure 5A:
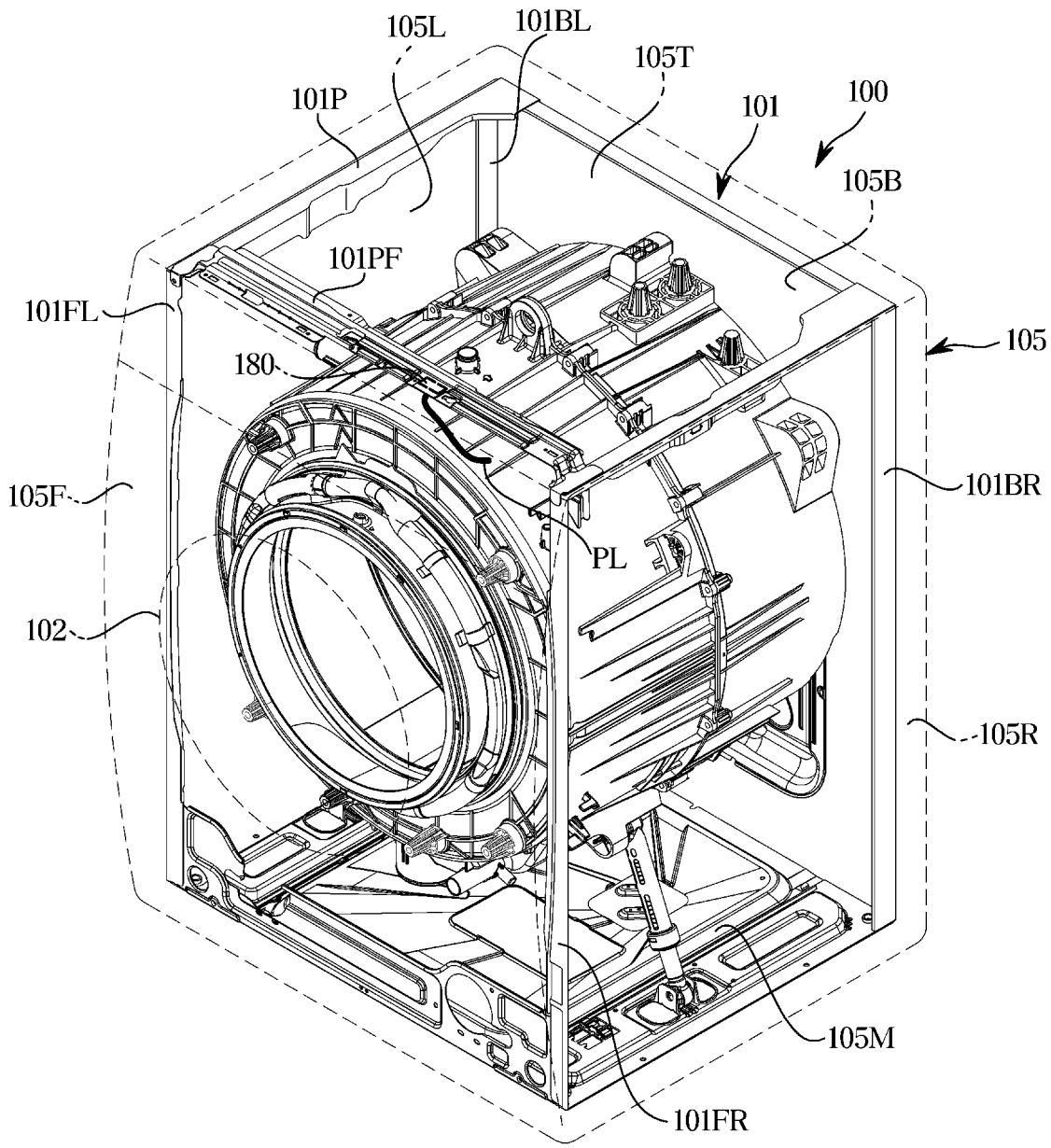
FIG. 5A is a view for describing an installation position of a vibration sensor according to another embodiment.
Figure 5A:
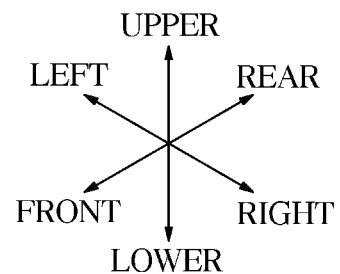
Figure 5B:
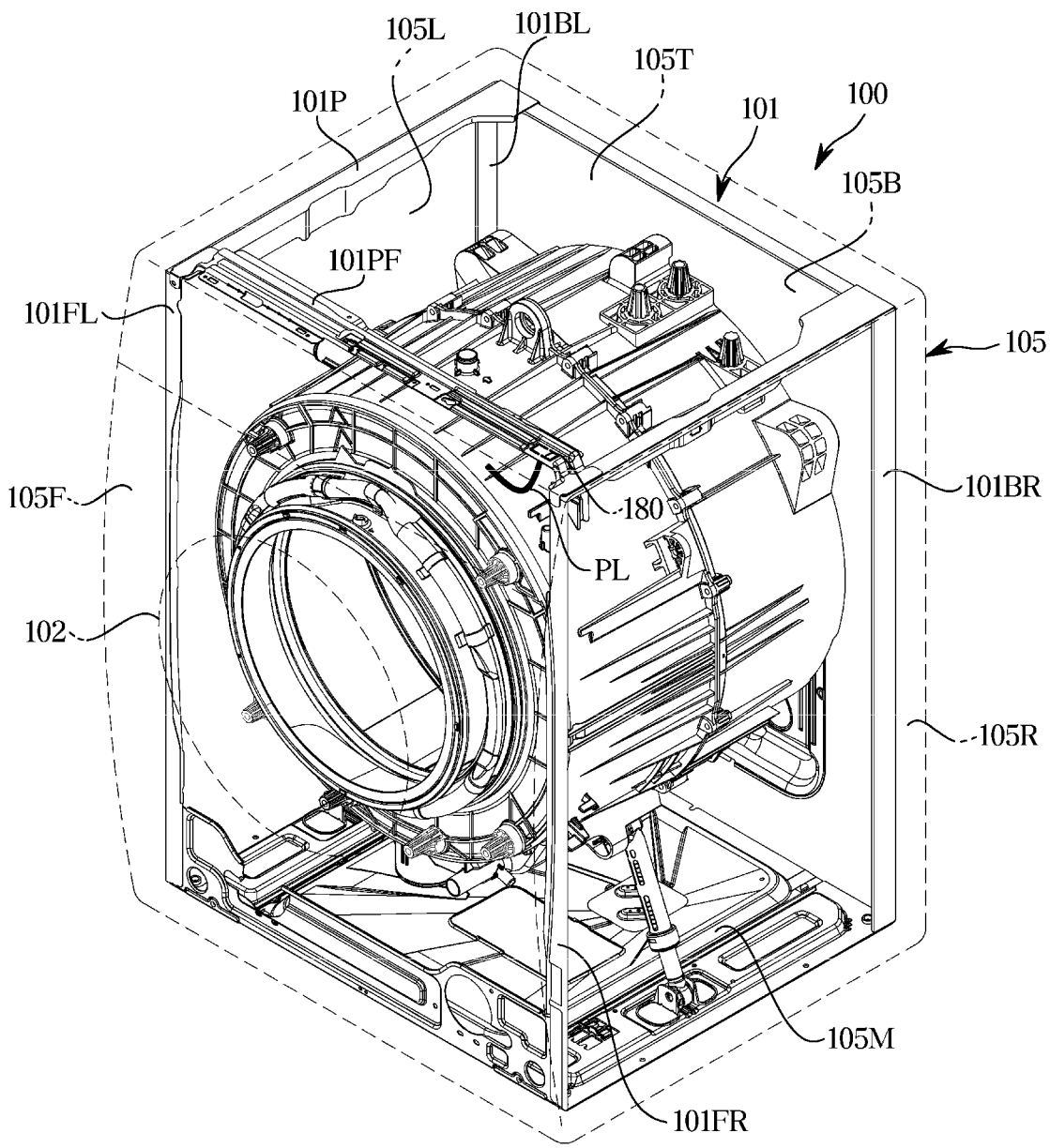
FIG. 5B is a view for describing an installation position of a vibration sensor according to another embodiment.
Figure 5B:
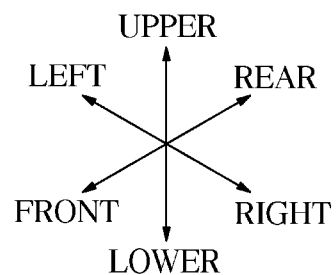

FIGS. 3A to 3C are views for describing an installation position of a vibration sensor according to an embodiment. FIGS. 4A to 4C are views for describing an installation position of a vibration sensor according to another embodiment. FIGS. 5A to 5C are views for describing an installation position of a vibration sensor according to another embodiment. The installation position of the vibration sensor 180 according to various embodiments will be described with reference to FIGS. 3A, 3B and 3C, FIGS. 4A, 4B and 4C, and FIGS. 5A and 5B.

Referring to FIG. 3A, the cabinet 100 of the clothes treatment apparatus 10 according to an embodiment may include a frame 101 constituting a skeleton of the cabinet 100 and a cover plate 105 surrounding the frame 101 to form the external appearance of the cabinet 100.

According to various embodiments, the frame 101 and the cover plate 105 may be integrally formed with each other or may be provided separately.

In one embodiment, the frame 101 forming the skeleton of the cabinet 100 may include horizontal frame 101P and post frames 101FL, 101FR, 101BL, and 101BR corresponding to each edge of the cabinet 100.

For example, the frame 101 may include a plurality of horizontal frames 101P corresponding to edges in the traverse direction and width direction of the cabinet 100 and a plurality of post frames 101FL, 101FR, 101BL, and 101BR corresponding to edges in the longitudinal direction of the cabinet 100.

The plurality of horizontal frames 101P may include a front upper horizontal frame 101PF provided on a front upper side of the cabinet 100.

The plurality of horizontal frames 101P and the plurality of post frames 101FL, 101FR, 101BL, and 101BR may have a varying angle and/or length with respect to the ground according to the shape of the cabinet 100.

For example, the upper horizontal frames among the plurality of horizontal frames 101P may be provided to form a predetermined angle with the ground. In this case, the plurality of post frames 101FL, 101FR, 101BL, and 101BR may have different heights from each other.

For example, the heights of the rear post frames 101BL and 101BR may be higher or lower than the heights of the front post frames 101FL and 101FR.

In one embodiment, the frame 101 may be formed of a metal (e.g., steel) to have a relatively high rigidity.

In one embodiment, the cover plate 105 forming the external appearance of the cabinet 100 may include a front plate 105F, both side plates 105L and 105R, a rear plate 105B, an upper plate 105T, and a lower plate 105M.

According to various embodiments, at least two (e.g., the front plate 105F and both side plates 105L and 105R) of the front plate 105F, the side plates 105L and 105R, the rear plate 105B, the upper plate 105T, and the lower plate 105M may be integrally formed with each other, or may be formed separately from each other.

The shape of the cabinet 100 may be variously changed according to the design of the clothes treatment apparatus 10, and accordingly, the shape of the frame 101 and the cover plate 105 may also be variously changed.

The conventional clothes treatment apparatus includes a vibration sensor installed on the tub 120 because vibration mainly occurs in the tub 120, However, when the vibration sensor is installed on the tub 120, a noise source (e.g., a drum motor, a drain pump, a drum, etc.), from which noise occurs, may not be accurately identified.

To solve the limitation, the clothes treatment apparatus 10 according to the embodiment may include the vibration sensor 180 installed on the cabinet 100.

More specifically, the vibration sensor 180 may be installed on the frame 101 which forms the skeleton of the cabinet 100 and has a relatively high rigidity.

Compared to when the vibration sensor 180 is installed on one side (e.g., the cover plate 105) of the cabinet 100, the vibration sensor 180 installed on the frame 101 may more accurately detect the level of vibration of inner parts of the clothes treatment apparatus 10 and the level of vibration of the clothes treatment apparatus 10 itself.

According to various embodiments, the vibration sensor 180 may be installed on one of the plurality of post frames 101FL, 101FR, 101BL, and 101BR.

Referring to FIGS. 3A, 3B and 3C or FIGS. 4A, 4B and 4C, the vibration sensor 180 may be attached to one of front post frames 101FL and 101FR of the cabinet 100.

Referring to FIGS. 3A, 3B and 3C or 4A, 4B and 4C, in one embodiment, a front left post frame 101FL (hereinafter, a 'first post frame') may include a first panel 101FL-1 extending rightward with respect to a left side longitudinal edge L of the cabinet 100 and a second panel 101FL-2 extending rearward with respect to the left side longitudinal edge L of the cabinet 100.

In addition, a front right post frame 101FR (hereinafter, a 'second post frame') may include a third panel 101FR-1 extending leftward with respect to a right side longitudinal edge R of the cabinet 100 and a fourth panel 101FR-2 extending rearward with respect to the right side longitudinal edge R of the cabinet 100.

According to various embodiments, the vibration sensor 180 may be attached to the first post frame 101FL, specifically, to a rear surface of the first panel 101FL-1 of the first post frame 101FL (see FIG. 4B), or may be attached to a right surface of the second panel 101FL-2 of the first post frame 101FL (see FIG. 4C). That is, the vibration sensor 180 may be attached to an inner side of the first post frame 101FL.

According to another embodiment, the vibration sensor 180 may be attached to the second post frame 101FR, specifically, to a rear surface of the third panel 101FR-1 of the second post frame 101FR (se FIG. 3B) or may be attached to a left surface of the fourth panel 101FR-2 of the second post frame 101FR (see FIG. 3C). That is, the vibration sensor 180 may be attached to an inner side of the second post frame 101FR.

As the vibration sensor 180 is attached to the first post frame 101FL and/or the second post frame 101FR, vibrations generated from various components of the clothes treatment apparatus 10 may be most efficiently detected, and thus according to the disclosure, the noise source of the clothes treatment apparatus 10 may be accurately identified.

In addition, since the vibration sensor 180 is attached to the inner side of the first post frame 101FL and/or the second post frame 101FR, the vibration sensor 180 may be maximally prevented from interfering with other components of the clothes treatment apparatus 10 and may be efficiently connected to the controller 190 for receiving vibration signals.

In addition, the vibration sensor 180 may be attached to an upper side of the first post frame 101FL and/or the second post frame 101FR.

For example, the vibration sensor 180 may be installed at a position higher than ⅔ of a height h of the first post frame 101FL. In addition, the vibration sensor 180 may be installed at a position higher than ⅔ of a height h of the second post frame 101FR.

When the vibration sensor 180 is installed at a lower side of the first post frame 101FL or the second post frame 101FR, a vibration signal obtained from the vibration sensor 180 may be greatly changed depending on the installation environment (e.g., whether the floor is flat) of the clothes treatment apparatus 10. According to the disclosure, since the vibration sensor 180 is positioned at the upper side the first post frame 101FL and/or the second post frame 101FR, a change in the vibration signal according to the installation environment of the clothes treatment apparatus 10 may be prevented, and accordingly, the installation environment of the clothes treatment apparatus 10 may be identified based on the vibration signal.

In one embodiment, the vibration sensor 180 may be installed in the vicinity of an area including a bend that provides the first post frame 101FL and/or the second post frame 101FR with local rigidity.

In addition, the vibration sensor 180 may be first assembled on the inner side of the first post frame 101FL and/or the second post frame 101FR and then firmly fixed to the inner side of the first post frame 101FL and/or the second post frame 101FR through a screw assembly method.

A wire PL connected to the vibration sensor 180 may include a power line for receiving power and/or a control line for transmitting a vibration signal to the controller 190.

In one embodiment, when the vibration sensor 180 is installed at the upper side of the first post frame 101FL and/or the second post frame 101FR, the wire PL connected to the vibration sensor 180 may be easily connected to a rear surface of the control panel 110 positioned on the front upper side of the cabinet 100. That is, as the vibration sensor 180 is attached to the upper side of the first post frame 101FL and/or the second post frame 101FR, the vibration sensor 180 may be maximally prevented from interfering with other components and efficiently connected to the controller 190 receiving the vibration signal using the short-length wire PL.

In the above description, the vibration sensor 180 has been illustrated as being installed on the first post frame 101FL and/or the second post frame 101FR, but the technical idea is not limited thereto, and the vibration sensor 180 may be located on the rear post frames 101BL and 101BR or the upper horizontal frames 101P.

Referring to FIGS. 5A and 5B, the vibration sensor 180 may be attached to the front upper horizontal frame 101PF (hereinafter, referred to as a first horizontal frame).

For example, the vibration sensor 180 may be attached to the center of the first horizontal frame 101PF (see FIG. 5A), or may be attached to a side portion of the first horizontal frame 101PF (see FIG. 5B).

In addition, the vibration sensor 180 may be attached to a rear side of the first horizontal frame 101PF, and as the vibration sensor 180 is attached to the rear side of the first horizontal frame 101PF, the vibration sensor 180 may most efficiently detect vibrations generated from various components of the clothes treatment apparatus 10.

The rear side of the first horizontal frame 101PF may refer to a surface opposite to a surface of the first horizontal frame 101PF that comes in contact with the front plate 105F.

That is, the vibration sensor 180 may be attached to the rear side of the first horizontal frame PF so as not to contact the front plate 105F.

According to the disclosure, the vibration sensor 180 may efficiently detect only the vibration transmitted from the first horizontal frame PF without detecting the vibration transmitted from the front plate 105F.

In addition, when the vibration sensor 180 is attached to the first horizontal frame 101PF, which is a position that allows the user to optimally recognize the vibration, the vibration sensor 180 may accurately detect the level of vibration that the user may directly recognize.

In one embodiment, when the vibration sensor 180 is installed on the first horizontal frame 101PF, the wire PL connected to the vibration sensor 180 may be easily connected to a rear surface of the control panel 110 positioned on the front upper side of the cabinet 100. That is, as the vibration sensor 180 is attached to the upper side of the first horizontal frame 101PF, the vibration sensor 180 may be maximally prevented from interfering with other components and efficiently connected to the controller 190 receiving the vibration signal using the short-length wire PL.

According to the disclosure, the length of the wire PL connected to the vibration sensor 180 may be minimized, so that a damage to the wire PL due to the vibration of the tub 120 or an interference with other parts may be prevented.

In the above description, the vibration sensor 180 has been illustrated as being installed on the first horizontal frame 101PF, but the technical idea is not limited thereto, and the vibration sensor 180 may also be installed on the lower horizontal frames 101P.

The vibration sensor 180 according to the embodiment may detect vibration of the frame 101 constituting the cabinet 100.

The vibration sensor 180 may include an acceleration sensor that measures the acceleration of the frame 101 in three axes (X-axis, Y-axis, and Z-axis). For example, the vibration sensor 180 may be provided as a piezoelectric type acceleration sensor, a strain gauge type acceleration sensor, a piezo resistive type acceleration sensor, a capacitive type acceleration sensor, a servo type acceleration sensor, or an optical type acceleration sensor. In addition to the above, the vibration sensor 180 may be provided as various sensors (e.g., a gyroscope) capable of measuring the vibration of the frame 101.

The vibration sensor 180 may output a sensing value (hereinafter, referred to as a "vibration signal") regarding vibration of the frame 101. For example, the vibration sensor 180 may output a constant value (hereinafter, a 'vibration signal') corresponding to the vibration of the frame 101. The vibration sensor 180 may output a voltage value (hereinafter, a 'vibration signal') corresponding to the three-axis acceleration of the frame 101.

That is, the vibration sensor 180 may output a vibration signal in the time domain. The controller 190 of the clothes treatment apparatus 10 may determine a vibration displacement of the frame 101 corresponding to the vibration signal of the vibration sensor 180, and adjust the rotation speed of the drum motor 141 based on the vibration displacement of the frame 101.

The vibration sensor 180 may be provided as a micro electro mechanical system (MEMS) sensor. MEMS is a method developed according to the development of semiconductor technology, and a MEMS sensor may be manufactured through deposition, patterning through photolithography, and etching. The vibration sensor 180 may be formed of various materials, such as silicon, polymer, metal, or ceramic. The vibration sensor 180 manufactured in the MEMS method may have a size of a micrometer level.

Figure 6:
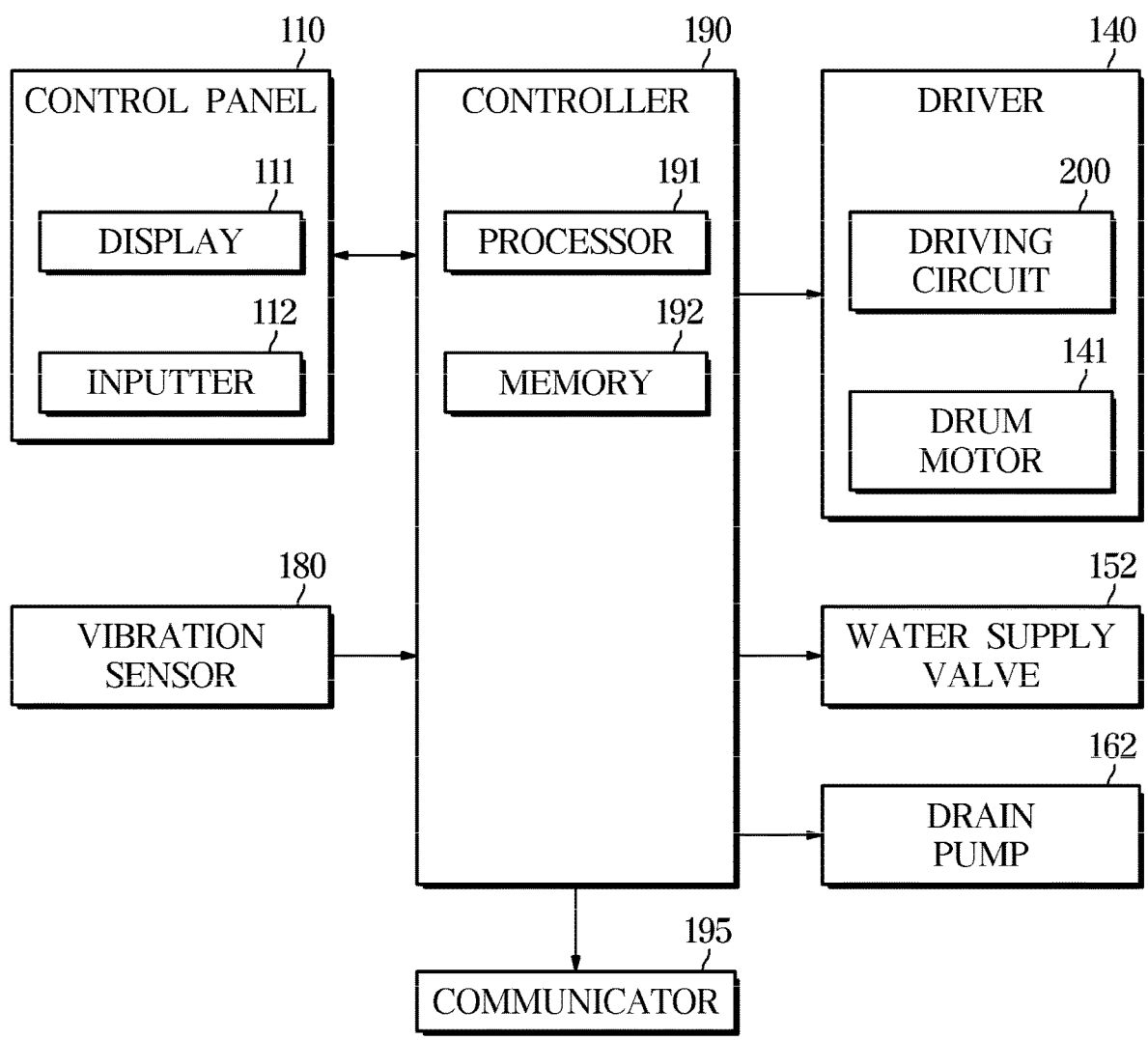
FIG. 6 is a control block diagram illustrating a clothes treatment apparatus according to an embodiment.

FIG. 6 is a control block diagram illustrating a clothes treatment apparatus according to an embodiment.

Referring to FIG. 6, the clothes treatment apparatus 10 may include the control panel 110, the driver 140, the water supply valve 152, the drain pump 162, the vibration sensor 180, the controller 190, and/or the communicator 195. The controller 190 may be electrically connected to the components of the clothes treatment apparatus 10 and may control the operation of each component.

The control panel 110 may include the display 111 for displaying washing setting and/or washing operation information in response to a user input, and an inputter 112 for obtaining a user input. The control panel 110 may provide a user interface for interaction between the user and the clothes treatment apparatus 10. The inputter 112 may include, for example, a power button, an operation button, a course selection dial, and a detailed setting button. In addition, the inputter 112 may be provided as a tact switch, a push switch, a slide switch, a toggle switch, a micro switch, or a touch switch.

The display 111 may include a screen for displaying various types of information and an indicator for displaying detailed settings selected by a setting button. The display 111 may include, for example, a liquid crystal display (LCD) panel and/or a light emitting diode (LED).

A washing courses of the clothes treatment apparatus 10 may include a washing setting (e.g., a washing temperature, a rinsing frequency, and a spin-drying strength) that are predetermined according to the type of laundry (e.g., shirt, pants, underwear, bedclothes), material (e.g., cotton, polyester, wool), and the amount of laundry. For example, a standard washing course may include a washing setting that is general to laundry. A bedclothes washing course may include a washing setting optimized for washing bedclothes. The washing course may include various courses, such as a standard washing course, a strong washing course, a wool washing course, a bedclothes washing course, a baby clothes washing course, a towel washing course, a small amount washing course, a steam washing course, a power-saving washing course, an outdoor ware washing course, a rinse+spin dry course, and a spin-dry course.

The driver 140 may include a drum motor 141 and a driving circuit 200. The driving circuit 200 may supply the drum motor 141 with a driving current for driving the drum motor 141 in response to a driving signal (a motor control signal) of the controller 190. The driving circuit 200 may rectify alternating current (AC) power of an external power source and convert the rectified AC power into direct current (DC) power, and convert the DC power into sinusoidal driving power. The driving circuit 200 may include an inverter that outputs the converted driving power to the drum motor 141. The inverter may include a plurality of switching elements, and open (off) or close (on) the plurality of switches based on a driving signal of the controller 190. A driving current may be supplied to the drum motor 141 according to the opening or closing of the switching elements. In addition, the driving circuit 200 may include a current sensor (not shown) capable of measuring the driving current output from the inverter.

The controller 190 may calculate the rotation speed of the drum motor 141 based on an electric angle of the rotor of the drum motor 141. The rotor electric angle may be obtained from a position sensor (not shown) provided in the drum motor 141. For example, the controller 190 may calculate the rotation speed of the drum motor 141 based on the amount of change in the rotor electric angle with respect to a sampling time interval. The position sensor (not shown) may be implemented as a hall sensor, encoder, or resolver capable of measuring the position of the rotor 143 of the drum motor 141. In addition, the controller 190 may calculate the rotation speed of the drum motor 141 based on a driving current value measured by a current sensor (not shown).

The drum motor 141 may rotate the drum 130 under the control of the controller 190. The controller 190 may drive the drum motor 141 to follow a target rotation speed.

The water supply valve 152 may be opened in response to a water supply signal from the controller 190. In response to the water supply valve 152 being opened, water may be supplied through the water supply pipe 151 to the tub 120.

The drain pump 162 may discharge water to the outside of the cabinet 100 through the drain pipe 161 in response to a drain signal from the controller 190. According to the operation of the drain pump 162, the water accommodated in the tub 120 may be discharged to the outside of the cabinet 100 through the drain pipe 161.

The vibration sensor 180 may detect the vibration of the frame 101. Specifically, the vibration sensor 180 may detect the vibration of the frame 101 generated by the rotation of the drum 130 during a washing course (e.g., a spin-drying cycle). Laundry unevenly disposed inside the drum 130 may cause an eccentricity of the drum 130, and the eccentricity of the drum 130 may cause vibration of the tub 120, and the vibration of the tub 120 may cause the frame 101 to vibrate. When the rotation speed of the drum motor 141 increases in a state in which the laundry is unevenly disposed, the vibration of the tub 120 may also increase, and noise caused by the vibration of the tub 120 may also increase.

The vibration sensor 180 may output a vibration signal related to the vibration of the frame 101. The controller 190 may receive the vibration signal output from the vibration sensor 180 and determine the rotation speed of the drum motor 141 based on the vibration signal.

The amplitude of the vibration signal may be defined as a magnitude (amplitude) of vibration when the frame 101 vibrates. The controller 190 may continuously receive the vibration signal output from the vibration sensor 180 until the course of the clothes treatment apparatus 10 is completed, and adjust the rotation speed of the drum motor 141 based on the vibration signal.

In an embodiment, the controller 190 may convert a vibration signal in the time domain output from the vibration sensor 180 into a vibration signal in the frequency domain, and process the vibration signal in the frequency domain.

The controller 190 may include a processor 191 that generates a control signal related to an operation of the clothes treatment apparatus 10, and a memory 192 that stores programs, applications, instructions, and/or data for the operation of the clothes treatment apparatus 10. The processor 191 and the memory 192 may be implemented as separate semiconductor devices or as a single semiconductor device. In addition, the controller 190 may include a plurality of processors or a plurality of memories. The controller 190 may be provided at various locations inside the clothes treatment apparatus 10. For example, the controller 190 may be included in a printed circuit board provided inside the control panel 110.

The processor 191 may include an arithmetic circuit, a memory circuit, and a control circuit. The processor 191 may include one chip or a plurality of chips. In addition, the processor 191 may include one core or a plurality of cores.

The memory 192 may store a program for performing a washing operation (or drying operation) according to a washing course (or drying course) and data including washing settings (or drying settings) according to the washing course (or drying course). In addition, the memory 192 may store a washing course (or drying course) and a washing setting (or drying setting) currently selected based on a user input.

In one embodiment, the memory 192 may store a program including an algorithm for converting a vibration signal in the time domain into a vibration signal in the frequency domain, an algorithm for classifying the vibration signal in the frequency domain into a plurality of orders, and the like, and may store data regarding a plurality of noise sources corresponding to amplitudes of the plurality of orders and data regarding reference amplitudes that are to be compared with the amplitudes of the plurality of orders. The memory 192 may include a volatile memory, such as an S-RAM, a D-RAM, and the like, and a non-volatile memory, such as a flash memory, a read only memory (ROM), an erasable programmable read only memory (EPROM), and the like. The memory 192 may include one memory device or a plurality of memory devices.

The processor 191 may process data and/or signals using a program provided from the memory 192, and may transmit a control signal to each component of the clothes treatment apparatus 10 based on a result of the processing. For example, the processor 191 may process a user input received through the control panel 110. The processor 191 may output a control signal for controlling the display, the drum motor 141, the water supply valve 152, and the drain pump 162 in response to a user input.

As another example, the processor 191 may use a program provided from the memory 192 to convert a time domain vibration signal into a frequency domain vibration signal, classify the frequency domain vibration signal into a plurality of orders, and determine a noise source of the clothes treatment apparatus 10 based on the amplitudes of the plurality of orders.

The processor 191 may control the driver 140, the water supply valve 152, and the drain pump 162 to perform a washing cycle, a rinsing cycle, and a spin-drying cycle. In addition, the processor 191 may control the control panel 110 to display washing settings and washing operation information.

In addition, the processor 191 may control the communicator 195 to transmit predetermined information to an external device.

Although not shown in the drawings, the controller 190 may further include various components for processing the vibration signal. For example, the controller 190 may include various components, such as an amplifier for amplifying an analog vibration signal and an A/D converter for converting the amplified analog vibration signal into a digital vibration signal.

The communicator 195 may transmit data to or receive data from an external device based on the control of the controller 190. For example, the communicator 195 may transmit/receive various types of data by communicating with a server and/or a user terminal device and/or a home appliance.

For this, the communicator 195 may support establishment of a direct (e.g., a wired) communication channel or a wireless communication channel between external electronic devices (e.g., a server, a user terminal device, and/or a home appliance), and communication execution through the established communication channel. According to an embodiment, the communicator 195 may include a wireless communication module (e.g., a cellular communication module, a short-range wireless communication module, or a global navigation satellite system (GNSS) communication module) or a wired communication module (e.g., a local area network (LAN) communication module, or a power line communication module). A communication module among the communication modules may communicate with an external electronic device through a first network (e.g., a short-range communication network, such as Bluetooth, wireless fidelity (WiFi) direct, or infrared data association (IrDA)) or a second network (e.g., a long-range communication network, such as a legacy cellular network, a 5G network, a next-generation communication network the Internet, or a computer network (e.g., LAN or WAN). Such various types of communication modules may be integrated into one component (e.g., a single chip) or may be implemented as a plurality of components (e.g., multiple chips) separated from each other.

According to various embodiments, the communicator 195 may establish communication with a user terminal device through a server.

In various embodiments, the communicator 195 may include a Wi-Fi module, and may perform communication with an external server and/or user terminal device based on establishing communication with an access point (AP) in the house.

Although the configuration of the clothes treatment apparatus 10 has been described above, the clothes treatment apparatus 10 may further include various components within the general technical scope.

For example, when the clothes treatment apparatus 10 is a drying machine, the clothes treatment apparatus 10 may further include a heat pump device.

Figure 7:
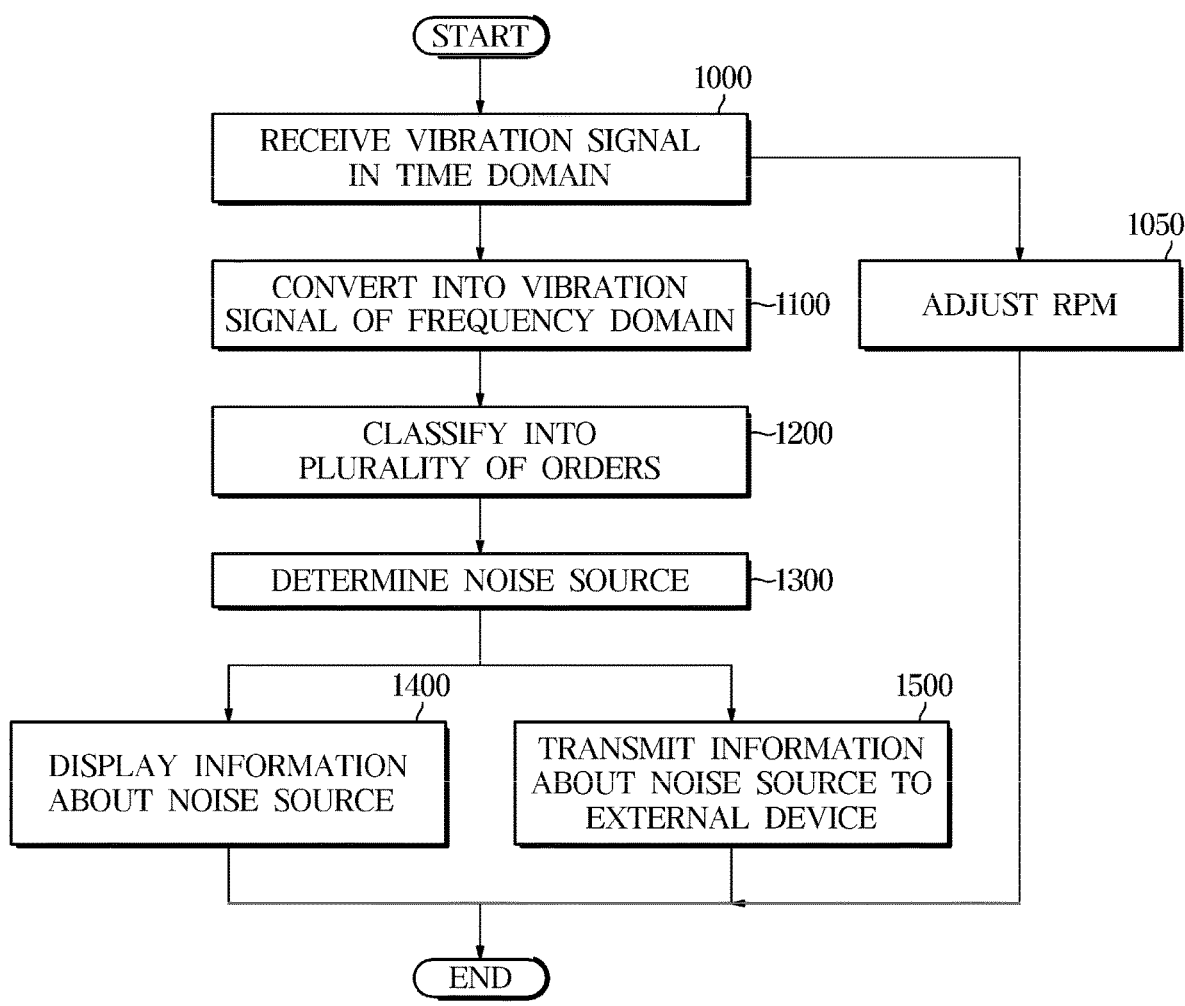
FIG. 7 is a flowchart showing a method of controlling a clothes treatment apparatus according to an embodiment.
Figure 8:
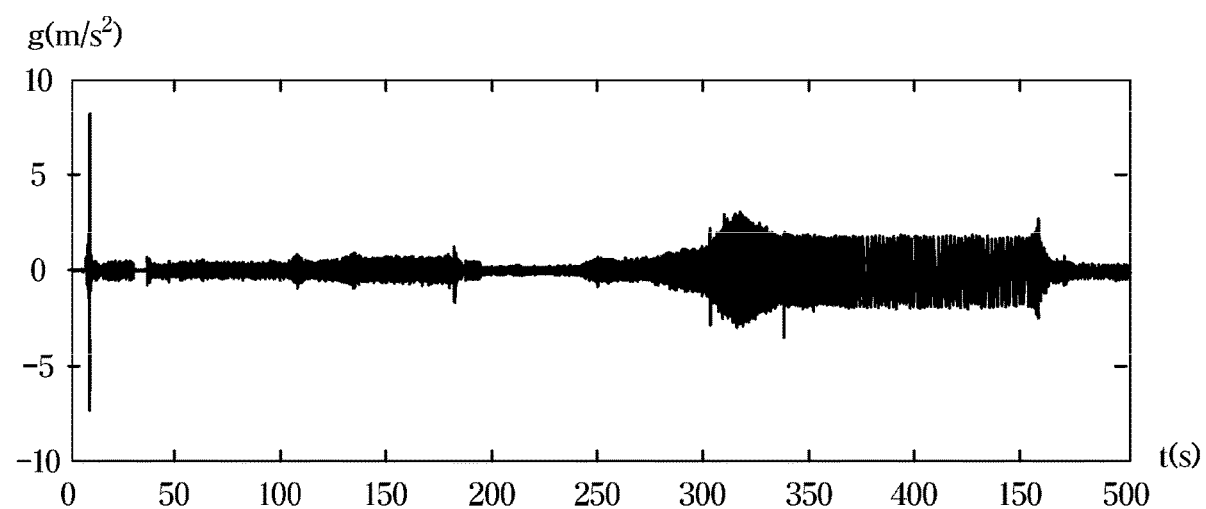
FIG. 8 is a view illustrating a vibration signal in a time domain obtained from a vibration sensor during an operation cycle of a clothes treatment apparatus according to an embodiment.
Figure 9:
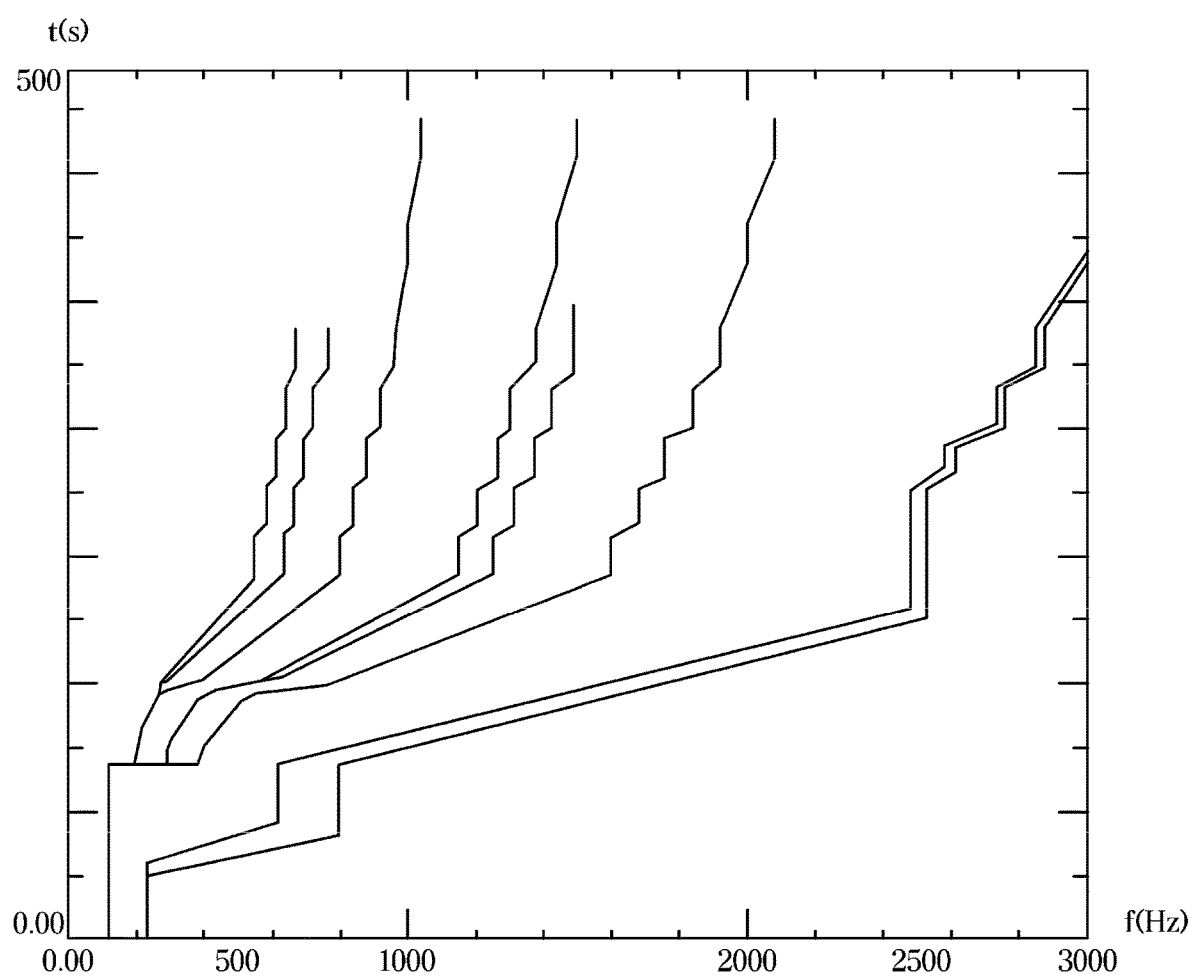
FIG. 9 is a graph showing a vibration signal in a frequency domain, which is converted from a vibration signal in a time domain obtained from a vibration sensor, according to an embodiment.
Figure 11:
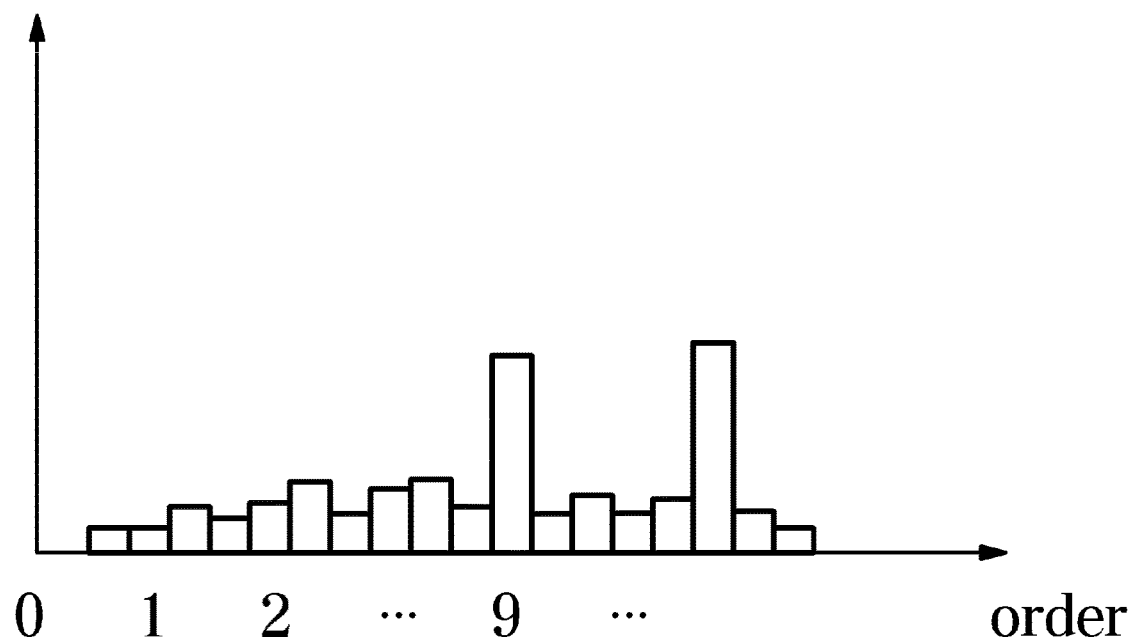
FIG. 11 is a view illustrating amplitudes of a plurality of orders corresponding to a plurality of noise sources of a clothes treatment apparatus according to an embodiment.
Figure 12:
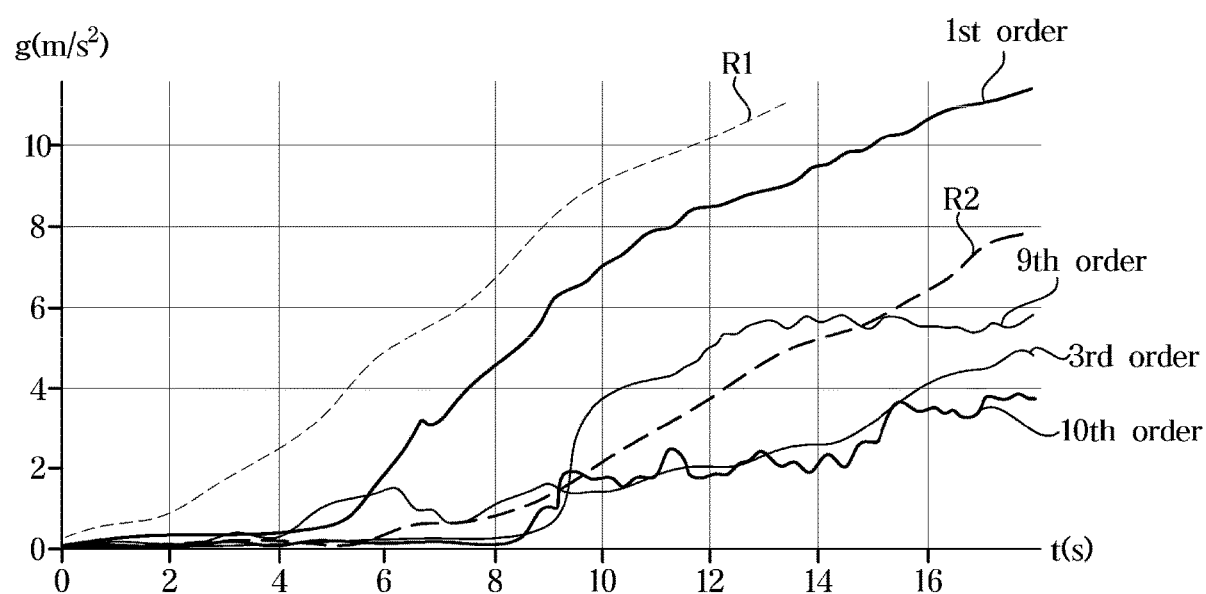
FIG. 12 is a graph in which vibration signals corresponding to a plurality of orders are classified in a time domain.
Figure 13:
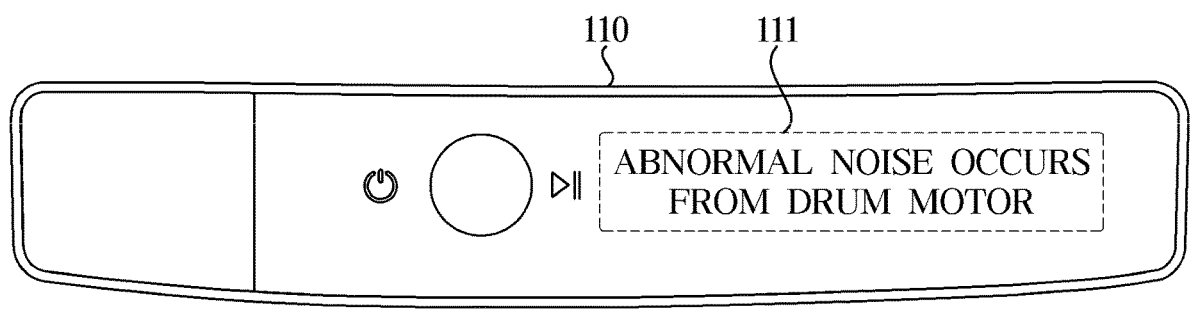
FIG. 13 is a view illustrating an example in which a clothes treatment apparatus according to an embodiment notifies a noise source.

FIG. 7 is a flowchart showing a method of controlling a clothes treatment apparatus according to an embodiment, FIG. 8 is a view illustrating a vibration signal in a time domain obtained from a vibration sensor during an operation of a clothes treatment apparatus according to an embodiment, FIG. 9 is a graph showing a vibration signal in a frequency domain, which is converted from a vibration signal in a time domain obtained from a vibration sensor, according to an embodiment, FIG. 10 is a view illustrating a plurality of orders corresponding to a plurality of noise sources of the clothes treatment apparatus according to an embodiment, FIG. 11 is a view illustrating amplitudes of a plurality of orders corresponding to a plurality of noise sources of the clothes treatment apparatus according to an embodiment, FIG. 12 is a graph in which vibration signals corresponding to a plurality of orders are classified in a time domain, and FIG. 13 is a view illustrating an example in which a clothes treatment apparatus according to an embodiment notifies a noise source.

Referring to FIG. 7, the controller 190 may receive a vibration signal in the time domain from the vibration sensor 180 (1000).

According to various embodiments, the controller 190 may adjust a rotational speed (RPM) of the drum motor 141 based on the vibration signal in the time domain (1050).

Referring to FIG. 8, the vibration signal in the time domain may include information about a vibration amount g of the frame according to time t.

The controller 190 may be configured to, based on the amplitude g of the vibration signal in the time domain exceeding a preset value, reduce the RPM of the drum motor 141 to a predetermined RPM, and based on the RPM of the drum motor 141 being maintained at the predetermined RPM for a preset time, increase the RPM of the drum motor 141 again to a preset RPM value.

According to the disclosure, the RPM of the drum motor 141 may be adjusted based on the vibration signal in the time domain, so that noise generated by the rotation of the drum 130 may be reduced.

Referring again to FIG. 7, the controller 190 may convert a vibration signal in the time domain into a vibration signal in the frequency domain (1100).

Referring to FIG. 9, the controller 190 may convert a vibration signal in the time domain into a vibration signal in the frequency domain having a time axis t and a frequency axis f.

The converting of the vibration signal in the time domain into the vibration signal in the frequency domain having a time axis and a frequency axis may be performed by a conventional technique.

Referring again to FIG. 7, the controller 190 may classify the vibration signal in the frequency domain into a plurality of orders based on the rotation speed of the drum motor Specifically, the controller 190 may calculate the vibration signal in the frequency domain divided by the rotation speed of the drum motor 141 as orders, to obtain a frequency-order diagram.

The classifying of the vibration signal in the frequency domain into a plurality of orders based on the rotation speed of the drum motor 141 may be performed by a conventional technique.

The controller 190 may determine a noise source of the clothes treatment apparatus 10 based on the amplitudes of the plurality of orders (1300).

Referring to FIG. 10, a plurality of orders may respectively correspond to a plurality of noise sources.

For example, the noise source corresponding to the first order (the 1st order) may be the drum 130, the noise source corresponding to the second order (the $2^{nd}$ order) may be the eccentricity of the drum 130, the noise source corresponding to the ninth order (the 9th order) may be the bearing 122a for rotatably fixing the drum motor 141, and the noise source corresponding to the thirty sixth order (the $36^{th}$ order) and/or the seventy second order (the $72^{nd}$ order) may be a fundamental noise of the drum motor 141 or a harmonic noise of the drum motor 141.

In addition, the noise sources respectively corresponding to the plurality of orders may include the drum 130, the unbalance of clothes inside the drum 130, the drum motor 141, the bearing 122a for rotatably fixing the drum motor 141, the shaft 141a of the drum motor 141, the tub 120, the frame 101, the drain pump 162, the pulsator and/or the pulsator motor, and other various configurations.

In addition, a vibration signal generated by a single component (e.g., the drain pump 162) that is not related to a main rotating body component may have a constant frequency, such as 50 Hz or 60 Hz, without a change in the frequency component even when the rotational speed of the drum motor 141 is changed.

According to the disclosure, the vibration sensor 180 may be attached to the frame 101, so that a vibration signal in the frequency domain may be classified into a plurality of orders, and the amplitude of each order is compared with a reference amplitude so that a noise source may be identified. When the vibration sensor is attached to the tub as in the conventional technology, only a direct vibration signal by the tub is detected, and it is difficult to detect a vibration signal caused by other components of the rotating body. In addition, when the vibration sensor is attached to the cover plate of the cabinet, it is difficult to accurately identify the noise source because the vibration signal caused by other rotating body components is insignificant.

In the embodiment, the controller 190 may compare the amplitude of each of the plurality of orders with a reference amplitude corresponding to a respective one of the plurality of orders, and determine a defect order having an amplitude exceeding the reference amplitude from among the plurality of orders, and determine an object corresponding to the defect order as a noise source.

To this end, the memory 192 may store information about objects corresponding to the plurality of orders, respectively, and information about a reference amplitude corresponding to each of the plurality of orders.

That is, the respective reference amplitudes corresponding to the plurality of orders may be different from each other. For example, the reference amplitude corresponding to the first order (the $1^{st}$ order) and the reference amplitude corresponding to the second order (the $2^{nd}$ order) may be different from each other.

Referring to FIG. 11, the amplitudes of the plurality of orders may be checked, and referring to FIG. 12, the amplitudes of the plurality of orders may be checked in the time domain.

In FIG. 11, when the amplitude of the ninth order (the $9^{th}$ order) is greater than the reference amplitude corresponding to the ninth order (the $9^{th}$ order), the controller 190 may identify an object (e.g., the bearing 122a) corresponding to the ninth order (the $9^{th}$ order) as a noise source.

In FIG. 12, a first line R1 may refer to a reference amplitude corresponding to the first order (the Pt order), and a second line R2 may refer to a reference amplitude corresponding to the third order (the $3^{rd}$ order), the ninth order (the $9^{th}$ order), and/or the tenth order (the $10^{th}$ order).

The controller 190 may be configured to, based on the amplitude corresponding to a specific order being exceeding the reference amplitude for a preset time, determine the specific order as a defect order.

Referring to FIG. 12, the controller 190 may determine the ninth order (the $9^{th}$ order) as a defect order based on the amplitude corresponding to the ninth order (the $9^{th}$ order) exceeding the reference amplitude R2 for about 4 seconds (from 10 s to 14 s), and determine an object (e.g., the bearing 122a) corresponding to the defect order as a noise source of the clothes treatment apparatus 10.

According to the embodiment of the disclosure, since the vibration sensor 180 is attached to the frame of the cabinet 100, indirect vibration by the tub 120 may be detected so that the RPM of the drum motor 141 may be adjusted, and vibration signals may be detected from rotating body related parts through frequency analysis so that noise sources may be accurately identified.

Referring again to FIG. 7, the controller 190 may control the display 111 to display information about the noise source based on the determined noise source (1400).

In this case, the information about the noise source may include a name and/or identification number that enables identification of the noise source, and may include information indicating the degree to which the amplitude of the order corresponding to the noise source exceeds the reference amplitude.

Referring to FIG. 13, for example, the controller 190 may determine the noise source as the drum motor 141 based on the thirty sixth order (the $36^{th}$ order) being determined as a defect order, and may control the display 111 to display information indicating that the drum motor 141 is determined as a noise source, to notify the user of a defect object (i.e., an object that generates noise).

According to various embodiments, the controller 190 may control the display 111 to display information about the noise source based on receiving a user input for checking a noise source through the inputter 112.

According to the embodiment of the disclosure, a user who has checked the display 111 may intuitively identify a part of the clothes treatment apparatus 10 that causes noise, and may take appropriate measures according to the noise source.

Referring again to FIG. 7, the controller 190 may control the communicator 195 to transmit information about the noise source to an external device based on the noise source being determined (1500).

In this case, the external device may refer to a user terminal device interworking with the clothes treatment apparatus 10 or an external server interworking with the clothes treatment apparatus 10.

According to the embodiment of the disclosure, when the external server corresponds to a management server managing the clothes treatment apparatus 10, a seller of the clothes treatment apparatus 10 may be allowed to take an appropriate action for the clothes treatment apparatus 10 having noise so that user satisfaction may be improved.

In addition, a user who has received the defect information through the user terminal device may be allowed to take an appropriate action for the clothes treatment apparatus 10 so that the user's dissatisfaction may be reduced.

Figure 14:
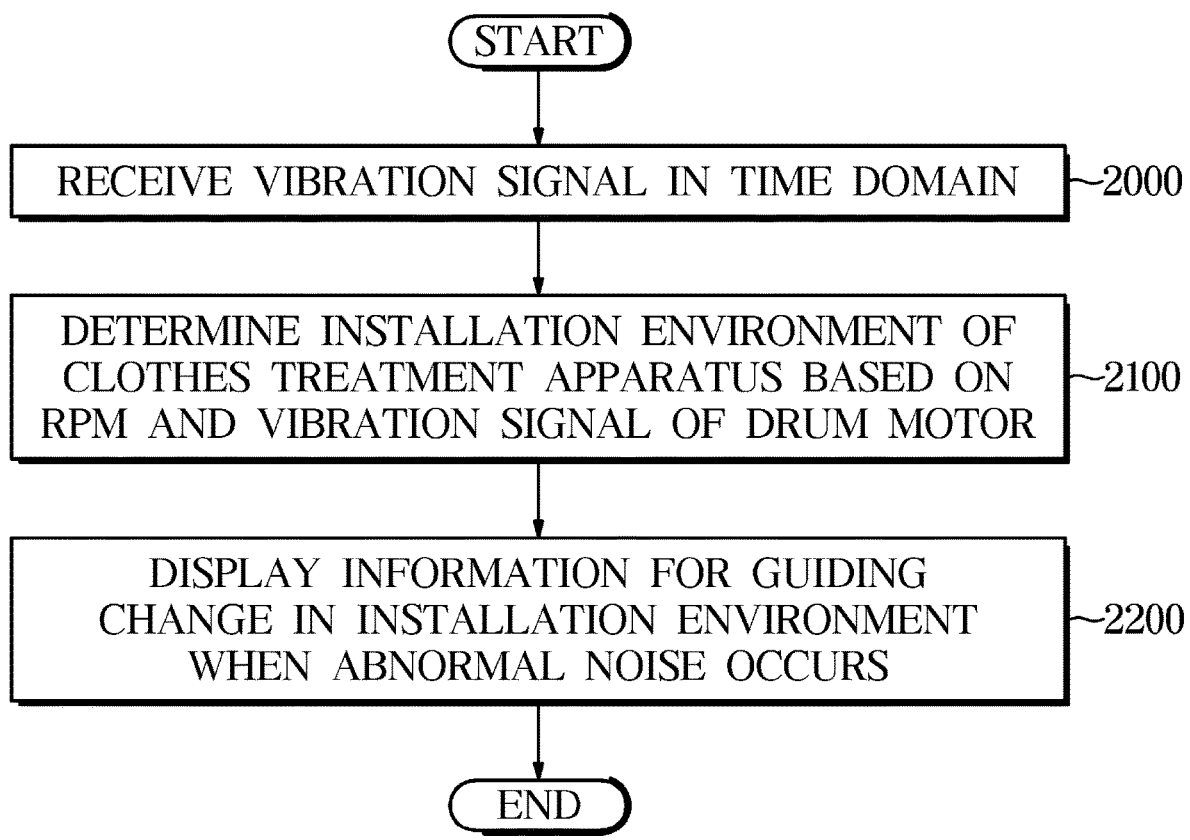
FIG. 14 is a flowchart showing a method of controlling a clothes treatment apparatus according to another embodiment.
Figure 15:
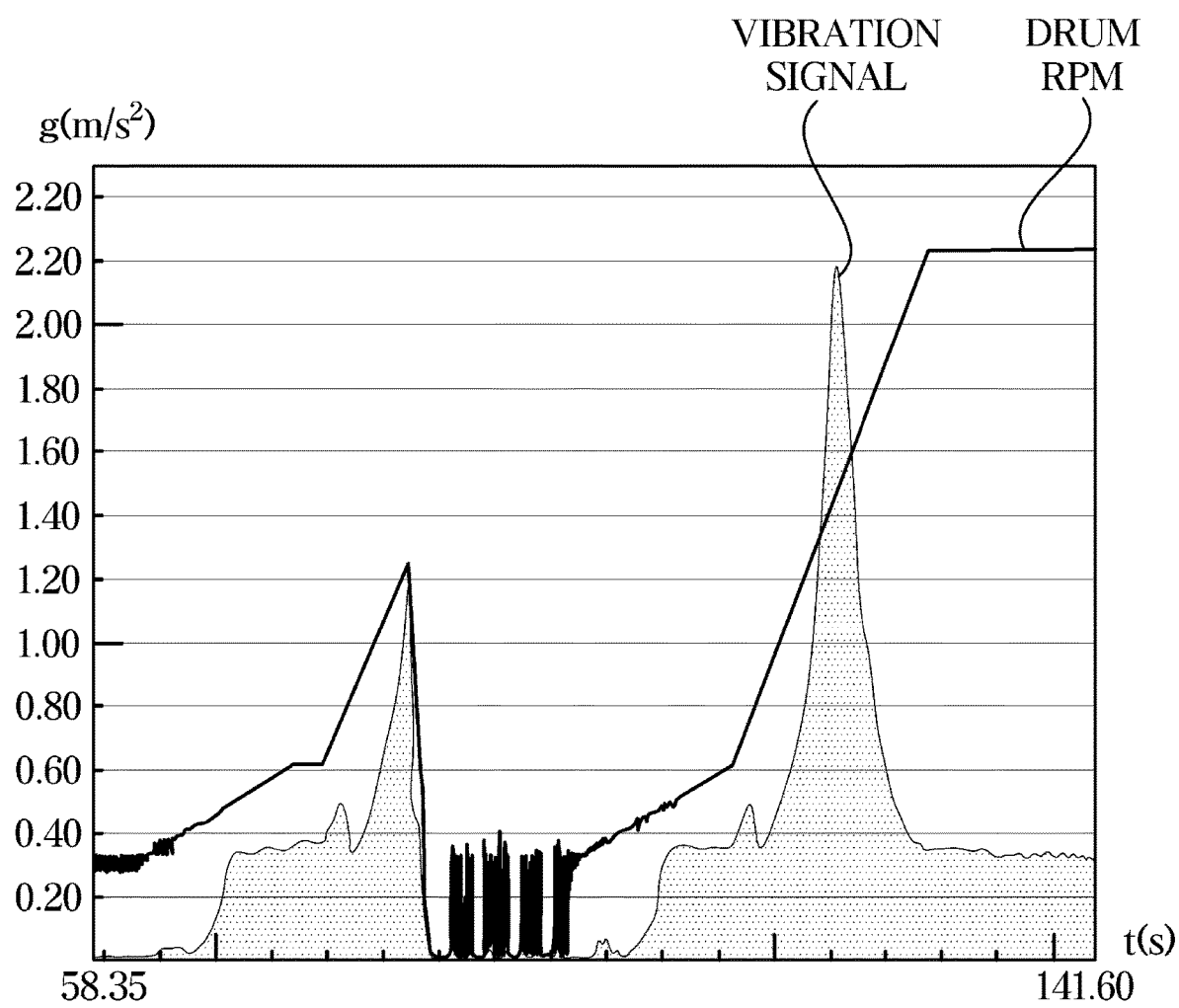
FIG. 15 is a graph showing a vibration signal according to a drum revolution per minute (RPM) of a clothes treatment apparatus according to an embodiment.
Figure 16:
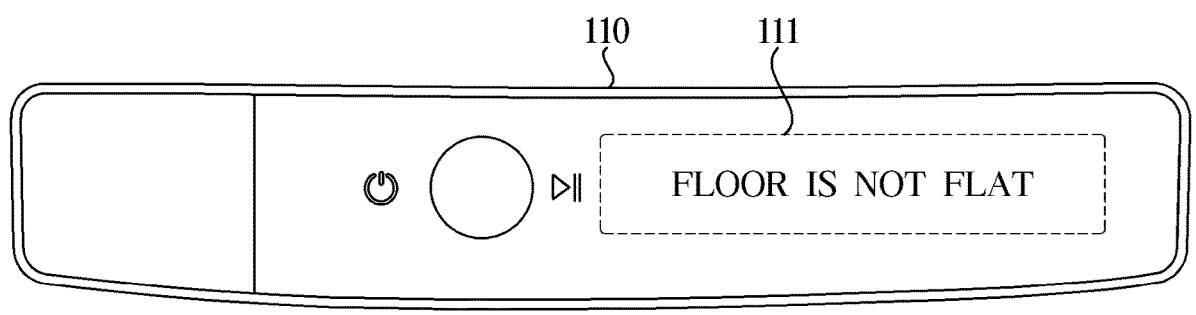
FIG. 16 is a view illustrating an example in which a clothes treatment apparatus according to an embodiment notifies an installation environment.

FIG. 14 is a flowchart showing a method of controlling a clothes treatment apparatus according to another embodiment. FIG. 15 is a graph showing a vibration signal according to a drum revolution per minute (RPM) of a clothes treatment apparatus according to an embodiment. FIG. 16 is a view illustrating an example in which a clothes treatment apparatus according to an embodiment notifies an installation environment.

Referring to FIG. 14, the controller 190 may receive a vibration signal in the time domain from the vibration sensor 180 (2000).

The controller 190 may determine an installation environment of the clothes treatment apparatus 10 based on the RPM and the vibration signal of the drum motor 141 (2100).

To this end, the memory 192 may store information about a normal waveform of the vibration signal corresponding to the RPM of the drum motor 141 and store information about an abnormal waveform of the vibration signal corresponding to the RPM of the drum motor 141.

The abnormal waveform of the vibration signal corresponding to the RPM of the drum motor 141 may include a plurality of waveforms, and the plurality of abnormal waveforms may correspond to different installation environments of the clothes treatment apparatus 10.

For example, when the vibration signal is similar to a first waveform, the controller 190 may determine that the clothes treatment apparatus 10 has an uneven installation condition, and when the vibration signal is similar to a second waveform, the controller 190 may determine that a part of the clothes treatment apparatus 10 is in contact with a specific object.

Referring to FIG. 15, a vibration signal corresponding to an RPM of the drum motor 141 may be checked.

Even in the same installation environment, a peak shown in FIG. 15 may not occur when the vibration sensor 180 is attached to the tub 120.

According to various embodiments, the controller 190 may determine the installation environment of the clothes treatment apparatus 10 based on a peak magnitude (e.g., about 2.2 m/s^2) of the vibration signal according to the RPM of the drum motor 141.

For example, the controller 190 may be configured to, based on the peak of the vibration signal being in a first range, determine that the clothes treatment apparatus 10 is installed on an uneven surface, and based on the peak of the vibration signal being in a second range, determine that a part of the clothes treatment apparatus 10 is in contact with a specific object.

The controller 190 may be configured to, based on the amplitude of the vibration signal being greater than or equal to a preset value, identify that abnormal noise has occurred, and determine an installation environment, which causes the abnormal noise, according to the waveform of the vibration signal.

Accordingly, the controller 190 may control the display 111 to display information guiding a change in the installation environment when abnormal noise occurs (2200).

In addition, the controller 190 may control the communicator 195 to transmit information guiding a change in the installation environment to an external device when abnormal noise occurs.

Referring to FIG. 16, when the abnormal noise is caused by an installation environment (e.g., an uneven floor), the display 111 may notify the user that the floor is not flat, and the user may take appropriate corresponding measures so that the generation of noise may be prevented.

According to the embodiment of the disclosure, since the vibration sensor 180 is attached to the frame 101, in particular, to the inner side of the front post frames 101FL and 101FR, the vibration of the tub 120 may be indirectly detected so that the RPM of the drum motor 141 may be adjusted, and vibrations caused by rotating body related components other than the tub 120 may be detected so that an accurate noise source may be identified through frequency analysis, and abnormal noise generated according to the installation conditions of the clothes treatment apparatus 10 may also be determined.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

In addition, the computer readable storage medium may be provided in the form of a non-transitory storage medium. Here, when a storage medium is referred to as "non-transitory," it may be understood that the storage medium is tangible and does not include a signal (e.g., an electromagnetic waves), but rather that data is semi-permanently or temporarily stored in the storage medium. For example, the 'non-transitory storage medium' may include a buffer in which data is temporarily stored.

According to one embodiment, the methods according to the various embodiments disclosed herein may be provided in a computer program product. The computer program product may be traded between a seller and a buyer as a product. The computer program product may be distributed in the form of a machine-readable storage medium (e.g., compact disc read only memory (CD-ROM)), or may be distributed through an application store (e.g., Play Store™)

online (e.g., download or upload). In the case of online distribution, at least a portion of the computer program product (e.g., a downloadable app) may be stored at least semi-permanently or may be temporarily generated in a storage medium, such as a memory of a server of a manufacturer, a server of an application store, or a relay server.

One aspect of the disclosure provides a clothes treatment apparatus capable of identifying a noise source in which abnormal noise occurs and providing a user with information about the noise source, and a method of controlling the same.

One aspect of the disclosure provides a clothes treatment apparatus capable of reducing generation of abnormal noise and a method of controlling the same.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

What is claimed is:

1. A clothes treatment apparatus comprising:
    a frame to form a skeleton of a cabinet;
    a cover plate surrounding the frame and forming an external surface of the cabinet;
    a tub in the cabinet;
    a drum in the tub and configured to be rotatable;
    a motor configured to rotate the drum;
    a vibration sensor on the frame and configured to sense a vibration of the frame and output a vibration signal in a time domain related to the vibration of the frame; and
    a processor configured to:
        convert the vibration signal in the time domain into a vibration signal in a frequency domain,
        classify, based on a rotation speed of the motor, the vibration signal in the frequency domain into a plurality of orders respectively corresponding to a plurality of noise sources of the clothes treatment apparatus, and
        determine a noise source of the plurality of noise sources based on amplitudes of a plurality of amplitudes respectively corresponding to the plurality of orders.

2. The clothes treatment apparatus of claim 1, wherein the processor is further configured to:
    compare, for each order of the plurality of orders, an amplitude of the plurality of amplitudes with a reference amplitude of a plurality of reference amplitudes respectively corresponding to the plurality of orders;
    determine a defect order based on the amplitude exceeding the reference amplitude; and
    determine an object corresponding to the defect order as the noise source.

3. The clothes treatment apparatus of claim 1, further comprising:
    a communicator configured to communicate with an external device,
    wherein the processor is configured to control the communicator to transmit information about the noise source of the clothes treatment apparatus to the external device.

4. The clothes treatment apparatus of claim 1, further comprising:
    a display,
    wherein the processor is configured to control the display to display information about the noise source of the clothes treatment apparatus.

5. The clothes treatment apparatus of claim 1, wherein the processor is configured to determine an installation environment of the clothes treatment apparatus based on the vibration signal in the time domain.

6. The clothes treatment apparatus of claim 1, wherein the processor is configured to adjust the rotation speed of the motor based on the vibration signal in the time domain.

7. The clothes treatment apparatus of claim 1, further comprising:
    a door at a front of the cabinet,
    wherein the frame includes a plurality of post frames corresponding to edges along a longitudinal direction of the cabinet, and
    the vibration sensor is attached to a post frame of the plurality of post frames that is on a front side of the cabinet.

8. The clothes treatment apparatus of claim 7, wherein the post frame includes:
    a left side post frame including a first panel extending rightward with respect to a left side longitudinal edge of the cabinet and a second panel extending rearward with respect to the left side longitudinal edge of the cabinet, and
    a right side post frame including a third panel extending leftward with respect to a right side longitudinal edge of the cabinet and a fourth panel extending rearward with respect to the right side longitudinal edge of the cabinet, and
    the vibration sensor is attached to one of a rear surface of the first panel, a right surface of the second panel, a rear surface of the third panel, and a left surface of the fourth panel.

9. The clothes treatment apparatus of claim 7, wherein the vibration sensor is attached to an upper side of the post frame.

10. The clothes treatment apparatus of claim 1, further comprising:
    a door at a front of the cabinet,
    wherein the frame includes a plurality of horizontal frames corresponding to edges in a traverse direction of the cabinet, and
    the vibration sensor is attached to a horizontal frame of the plurality of horizontal frames that is an upper horizontal frame on a front side of the cabinet.

11. The clothes treatment apparatus of claim 10, wherein the cover plate includes a front plate corresponding to the front of the cabinet, and
    the vibration sensor is attached to the horizontal frame without being in contact with the front plate.

12. A method of controlling a clothes treatment apparatus, the method comprising:
    receiving a vibration signal in a time domain that is output from a vibration sensor attached to a frame forming a skeleton of a cabinet of the clothes treatment apparatus;
    converting the vibration signal in the time domain into a vibration signal in a frequency domain;
    classifying, based on a rotation speed of a motor, the vibration signal in the frequency domain into a plurality of orders respectively corresponding to a plurality of noise sources of the clothes treatment apparatus; and
    determining a noise source of the plurality of noise sources based on amplitudes of a plurality of amplitudes respectively corresponding to the plurality of orders.

13. The method of claim 12, wherein the determining of the noise source includes:
  comparing, for each order of the plurality of orders, an amplitude of the plurality of amplitudes with a reference amplitude of a plurality of reference amplitudes respectively corresponding to the plurality of orders;
  determining a defect order based on the amplitude exceeding the reference amplitude; and
  determining an object corresponding to the defect order as the noise source.

14. The method of claim 12, further comprising transmitting information about the noise source of the clothes treatment apparatus to an external device.

* * * * *